(12) United States Patent
Daher et al.

(10) Patent No.: US 11,613,114 B2
(45) Date of Patent: Mar. 28, 2023

(54) METHOD, APPARATUS, AND NON-TRANSITORY COMPUTER-READABLE STORAGE MEDIUM FOR ALTERING A DIGITAL IMAGE FOR A PRINTING JOB

(71) Applicant: LEAD TECHNOLOGIES, INC., Charlotte, NC (US)

(72) Inventors: Moe Daher, Charlotte, NC (US); Waseem Shadid, Charlotte, NC (US)

(73) Assignee: LEAD TECHNOLOGIES, INC., Charlotte, NC (US)

( * ) Notice: Subject to any disclaimer, the term of this patent is extended or adjusted under 35 U.S.C. 154(b) by 58 days.

(21) Appl. No.: 17/244,488

(22) Filed: Apr. 29, 2021

(65) Prior Publication Data
US 2022/0348003 A1 Nov. 3, 2022

(51) Int. Cl.
*B41F 33/00* (2006.01)
*G06F 3/12* (2006.01)
*G06T 7/12* (2017.01)

(52) U.S. Cl.
CPC ...... *B41F 33/0045* (2013.01); *B41F 33/0009* (2013.01); *B41F 33/0027* (2013.01); *G06F 3/1208* (2013.01); *G06F 3/1256* (2013.01); *G06T 7/12* (2017.01)

(58) Field of Classification Search
CPC .............. B41F 33/0045; B41F 33/0009; B41F 33/0027; G06F 3/1208; G06F 3/1256; G06F 2206/1506; G06F 3/1219; G06F 3/1247; G06F 3/1285; G06T 7/12; G06T 2207/30168; G06T 2207/30176; G06T 7/181; G06T 2207/10024; G06T 7/0004

USPC .......................................................... 358/1.9
See application file for complete search history.

(56) References Cited

U.S. PATENT DOCUMENTS

| | | |
|---|---|---|
| 2003/0019382 A1 | 1/2003 | Furukawa |
| 2004/0080551 A1 | 4/2004 | Nunokawa |
| 2006/0038845 A1* | 2/2006 | Kawatoko ............ B41J 2/17566 347/16 |
| 2007/0189615 A1 | 8/2007 | Liu et al. |

(Continued)

FOREIGN PATENT DOCUMENTS

CN 102009533 A 4/2011

OTHER PUBLICATIONS

International Search Report and Written Opinion of the International Searching Authority dated Aug. 5, 2021 in PCT/US21/30251, 14 pages.

(Continued)

*Primary Examiner* — Darryl V Dottin
(74) *Attorney, Agent, or Firm* — Oblon, McClelland, Maier & Neustadt, L.L.P.

(57) ABSTRACT

A method, apparatus, and non-transitory computer-readable storage medium for altering a digital image for a printing job, the method comprising receiving a requested printing job including the digital image, performing a segmentation on the digital image, extracting values of properties for a segment of the segmented digital image, determining, based on the extracted values of the properties for the segment, whether the segment of the digital image should be altered, and altering the segment of the digital image when it is determined the segment of the digital image should be altered, a resulting altered digital image being transmitted to a printer for printing.

17 Claims, 18 Drawing Sheets

(56) References Cited

U.S. PATENT DOCUMENTS

| | | |
|---|---|---|
| 2008/0278744 A1 | 11/2008 | Marchesotti et al. |
| 2009/0232528 A1 | 9/2009 | Togami |
| 2012/0113188 A1* | 5/2012 | Ishii .................. B41J 25/308 |
| | | 347/34 |
| 2018/0013950 A1* | 1/2018 | Steinberg ............ G06V 40/161 |
| 2018/0275523 A1 | 9/2018 | Bl et al. |
| 2019/0020787 A1 | 1/2019 | Xu et al. |

OTHER PUBLICATIONS

Englund, C. et al., "Ink feed control in a web-fed offset printing press" The International Journal of Advanced Manufacturing Technology. vol. 39, pp. 919-930. Retrieved from: https://www.diva-portal.org/smash/get/diva2:404940/FULLTEXT01.pdf.

* cited by examiner

METHOD, APPARATUS, AND NON-TRANSITORY COMPUTER-READABLE STORAGE MEDIUM FOR ALTERING A DIGITAL IMAGE FOR A PRINTING JOB

BACKGROUND

Field of the Disclosure

The present disclosure relates to altering digital images in printing jobs using image processing functionality.

Description of the Related Art

Computer printers, which may be personal or commercial, are responsible for converting digital media into tangible media. Liquid inkjet printers, commonly found in personal applications, offer users a practical and efficient solution to at home printing needs.

However, personal users and commercial users alike appreciate that printing activities can be resource heavy and the activities associated with replacing those resources can be time-consuming and costly. For instance, as it relates to personal printers, few users look forward to the replacement of an ink cartridge and the associated costs that appear disproportionately high. In instances of commercial printers, which generate large volumes of tangible media, corresponding resource demand is high and can lead to delays in printing output and printing quality.

Presently, computer printer manufacturers and attendant software engineers offer few solutions to reducing resource demand in real time. Any solutions that do exist (e.g., reducing resolution, printing in greyscale, buying in bulk) require manual input from the user and, thus, cannot be rapidly implemented in real-time for each print job. A new approach to this problem is needed.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

The present disclosure relates to reducing ink demand in printing jobs.

According to an embodiment, the present disclosure further relates to a method for altering a digital image for a printing job, comprising receiving, by processing circuitry, a requested printing job including the digital image, performing, by the processing circuitry, a segmentation on the digital image, extracting, by the processing circuitry, values of properties for a segment of the segmented digital image, determining, by the processing circuitry and based on the extracted values of the properties for the segment, whether the segment of the digital image should be altered, and altering, by the processing circuitry, the segment of the digital image when it is determined the segment of the digital image should be altered, a resulting altered digital image being transmitted to a printer for printing.

According to an embodiment, the present disclosure further relates to a non-transitory computer-readable storage medium storing computer-readable instructions that, when executed by a computer, cause the computer to perform a method for altering a digital image for a printing job, comprising receiving a requested printing job including the digital image, performing a segmentation on the digital image, extracting values of properties for a segment of the segmented digital image, determining, based on the extracted values of the properties for the segment, whether the segment of the digital image should be altered, and altering the segment of the digital image when it is determined the segment of the digital image should be altered, a resulting altered digital image being transmitted to a printer for printing.

According to an embodiment, the present disclosure further relates to an apparatus for altering a digital image for a printing job, comprising processing circuitry configured to receive a requested printing job including the digital image, perform a segmentation on the digital image, extract values of properties for a segment of the segmented digital image, determine, based on the extracted values of the properties for the segment, whether the segment of the digital image should be altered, and alter the segment of the digital image when it is determined the segment of the digital image should be altered, a resulting altered digital image being transmitted to a printer for printing.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
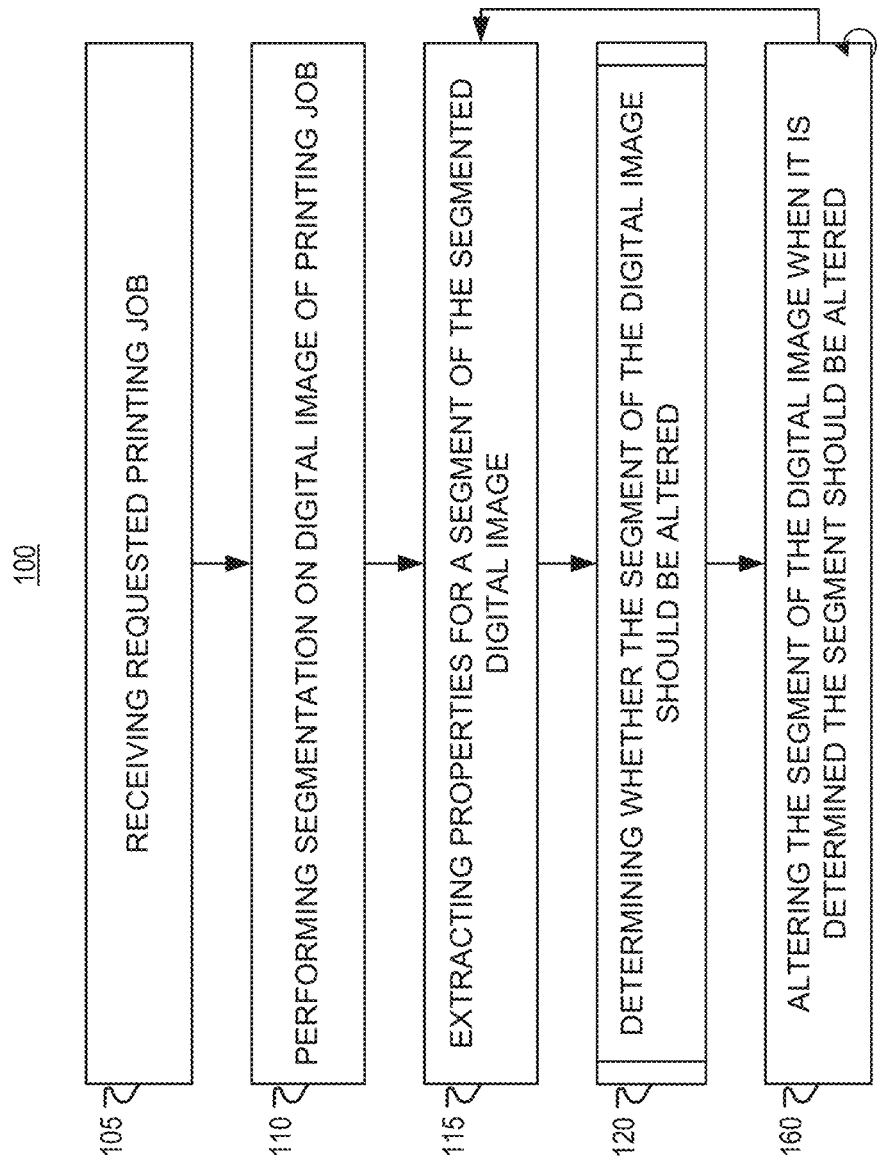
FIG. 1 is a flow diagram of a method for altering digital images in printing jobs, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

According to an embodiment, the present disclosure relates to a method for reducing the amount of ink used by a printer during a printing job. The method integrates image processing, machine learning, and artificial intelligence techniques with existing printers or printer software to modify areas of a printable page requiring ink so as to reduce ink demand.

As background, it should be appreciated that digitized documents and pictures can be printed by rasterizing them into digital images and then sending these images to printers as printing jobs. While the methods of the present disclosure could be applied at a site of a printer or within circuitry of a printer, the methods of the present disclosure will be described herein as software, or computer-implementable instructions, that can be executed or performed at a client device prior to sending printing instructions to the printer (wherever the printer may be).

In an embodiment, the methods of the present disclosure can be applied to any document that is desired to be printed. Examples of such documents include vector graphics files (e.g., SVG, EPS, PDF, AI) and raster graphics files (e.g., JPEG, PNG, APNG, GIF, MPEG4), among others.

In an embodiment, the methods of the present disclosure are applied to a requested printing job while the printing job is in a native file format. For instance, the method may be applied to an Adobe Illustrator (AI) file format and, in another instance, to an Encapsulated PostScript (EPS) file format.

In another embodiment, the methods of the present disclosure are applied to a requested printing job after converting the printing job from a native file format to a preferred segmentable file format. For instance, the preferred segmentable file format may be a Portable Document Format (PDF). In an example, an image having a Joint Photographic Experts Group (JPEG) file format can be converted to a PDF file format prior to being segmented and further processed according to the methods of the present disclosure.

Notably, unlike other approaches, the methods of the present disclosure consider a reduction in ink demand for a printable page based on different ink demands in different areas of the page. Thus, instead of applying a single approach to an entire page (e.g. greyscale) or only applying corrective measures at the level of the pixel, the methods of the present disclosure provide an intelligent, adaptive approach to reducing ink demand.

In view of the above and as will be described below, the methods of the present disclosure provide a unique combination of image processing and machine learning and/or artificial intelligence techniques for altering images. The integrated task of the present disclosure can be performed on digital images that are sent to printing hardware, thus making it application independent. For instance, the image alteration may include, while maintaining image details, removing or reducing a density of areas that are detected to have a color opposite a color of a printing paper. The advantages of the method of the present disclosure include reducing ink demand for printing jobs by inter alia targeting areas that convey little information of interest to the user. In other words, important information within an image can be maintained without "wasting" ink in non-informative areas. This advantage can be especially important in enterprises and large organizations where a huge magnitude of printing jobs are performed with no control over the contents of the printing jobs sent by users.

With reference now to the Drawings, FIG. 1 provides a flow diagram of an embodiment of the methods of the present disclosure.

As described, method 100 of FIG. 1 can be performed by a user device having processing circuitry or by a printer having processing circuitry. The method 100 can also be performed by remote processing circuitry within a cloud-based computing environment, the remote processing circuitry being an intermediary between the user device and the printer.

In an embodiment, and as will be described with reference to the Drawings, the method 100 is performed by a software of a user device. The user device may be a laptop computer, a desktop computer, a tablet, a mobile device, a cloud-based computing station, and the like. The software may be an independent application featuring a user interface or may be integrated with existing software.

In an embodiment, the software can be configured to minimize an ink demand of a requested printing job. In another embodiment, the software can be configured to process images of a requested printing job in order to reduce ink demand relative to an ink demand target value. In one instance, the ink demand target value can be defined independently from a specific printing job and may be a global value reflecting desired ink usage for any given printable page. For example, the ink demand target value may be a volume of ink dispensed on a given page or a volume of ink dispensed for a given printing job. In another instance, the ink demand target value may be defined relative to a 'regular' ink demand for a respective printable page of a printing job, relative to a file type, or based on a user profile requesting the printing job. For example, the ink demand target value may be 70% of a 'regular' ink demand for a given printable page.

Turning now to FIG. 1, a printing job requested by a user of a user device may be received at step 105 of method 100. As described, the software may be executed on the user device, in a cloud-based computing environment, or at the printer. For simplicity, the remainder of the disclosure will describe the software as being executed on the user device.

In an embodiment, the received printing job comprises one or more printable pages that may be documents, images, and the like. For instance, the file formats may be one of SVG, EPS, PDF, AI, JPEG, PNG, APNG, GIF, and MPEG4, among other file formats including DOCX, XLSX, PPTX, and the like. In an example, the documents, images, and the like may be received and processed by method 100 in their native formats. In another example, the documents, images, and the like may be received in their native formats and then converted to a common file format before continued processing by method 100. The common file format may be any format that is described above or otherwise considerable, though the common file format may be one that is segmentable by method 100.

In an embodiment, and as will be described with reference to the exemplary embodiment of FIG. 5A, step 105 of method 100 may include determining a 'regular' ink demand for the requested printing job. The 'regular' ink demand may be a volume of ink required to print a printable page of a printing job if normal printing rules are followed. In this way, an ink demand target value, defined by the user, can be used to perform fine adjustments of method 100. However, the remainder of method 100, as described relative to FIG. 1, will omit this consideration.

While a printing job of method 100 can include one or more printable pages, method 100 will be described with reference to a single printable page, or digital image.

At step 110 of method 100, segmentation is performed on the digital image of the printing job. The segmentation may be performed by machine learning techniques that include but are not limited to neural networks, convolutional neural networks, deep learning, and reinforcement learning. The segmentation may also be performed by region-based techniques such as watershed and region growing, edge-based methods such as edge detection and active contours, and threshold-based techniques including but not limited to Otsu, multi-level colors, fixed threshold, adaptive threshold, dynamic threshold, and automatic threshold. In an example, the segmentation may be a semantic segmentation. In another example, the segmentation may be a combination of the above described segmentation techniques.

In an exemplary embodiment, the digital image of the printing job is segmented at step 110 of method 100 in order to identify segments of the digital image that are closer to the opposite color of printing paper than the color of the printing paper. In other words, segments of the digital image having a high density of black will be identified as having a color that is opposite that of a white page of printing paper.

Following segmentation of the digital image at step 110 of method 100, each segment of the digital image can be analyzed at step 115 of method 100 in order to extract properties thereof. It can be appreciated that, in the event there are two or more segments resulting from the segmentation at step 110 of method 100, step 115 through step 160 of method 100 can be performed iteratively until all segments of the digital image have been processed. For simplicity, step 115 of method 100 will be described assuming the segmentation resulted in the digital image having only one segment.

In an embodiment, the analysis at step 115 of method 100 includes extracting values associated with properties of the segment of the digital image such as, but not limited to, color, area, perimeter, contour, edges, context, curvature, center of mass, contained objects, and shape. The values may be alphanumeric values, text strings, and the like. In an example, the extracted values may be values corresponding to the colors cyan, magenta, yellow, and black. For instance, the extracted values may be, respectively, 0, 0, 0, and 100. In another example, the extracted values may be, as it relates to area, a percentage of the digital image that the segment area occupies, wherein the digital image area is calculated as digital image width multiplied by digital image height. The properties may further include region to code vector derived according to techniques such as neural networks, deep learning, and the like. The region to code vector is a learned representation for image segments, where each segment is represented by a real-valued vector. Similar segments will, therefore, have similar representations. Each segment can be mapped to one vector and the vector values can be learned in a way that resembles a neural network. Thus, this technique may often be considered within the field of deep learning.

Figure 2A:
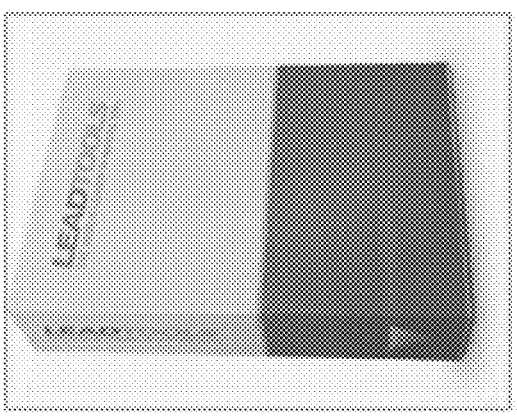
FIG. 2A is a cartoon of a segment of a digital image, according to an exemplary embodiment of the present disclosure.
Figure 2B:
FIG. 2B is a cartoon of a segment of a digital image, according to an exemplary embodiment of the present disclosure.
Figure 2C:
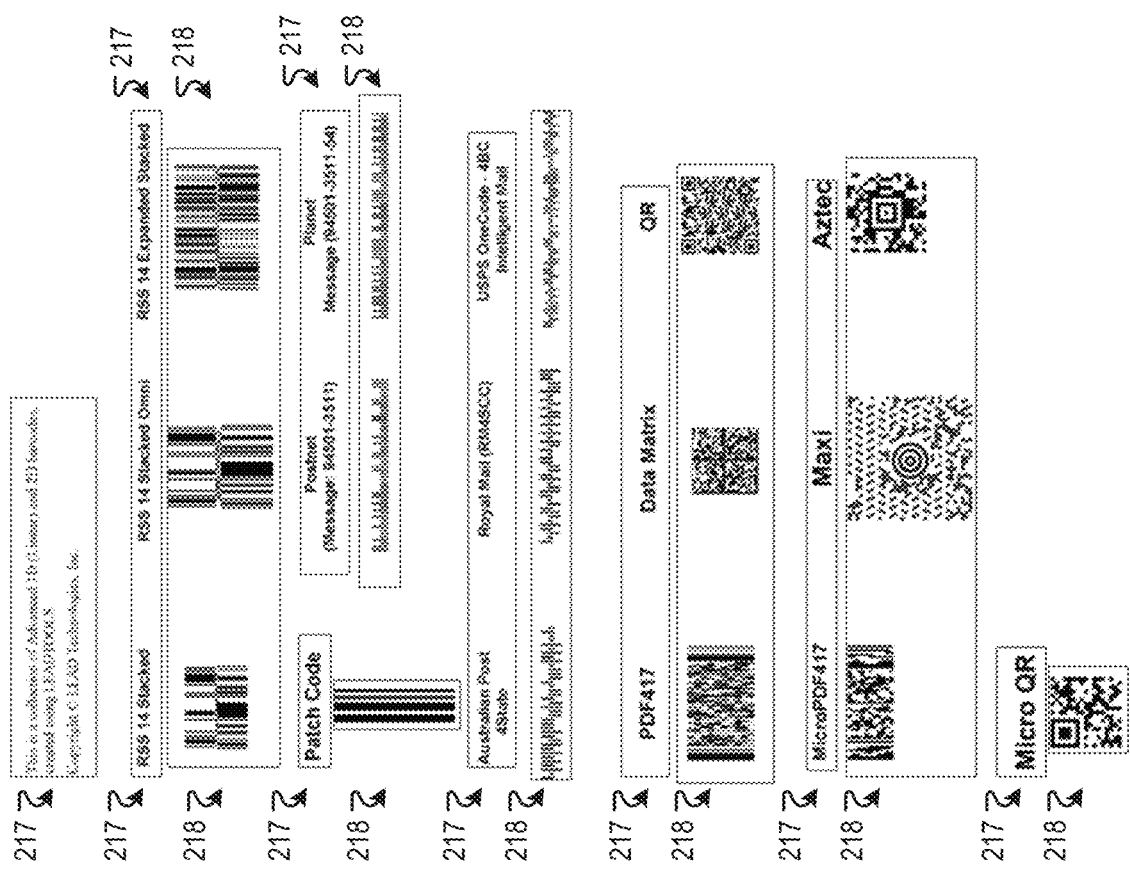
FIG. 2C is a cartoon of exemplary segments of a digital image, according to an exemplary embodiment of the present disclosure.

The context property can specify the type of information the segment of the digital image contains. The context property types include but are not limited to Text, Graphics, Table, Barcode, and MICR (Magnetic Ink Character Recognition). In an example, and as shown in FIG. 2A, the context property of the segment may be 'Graphics' 216. In another example, and as shown in FIG. 2B, the context property of the segment may be 'Text' 217. FIG. 2C shows a number of segments that are identified, relative to the context property, as either 'Text' 217 or 'Barcode' 218.

Having extracted values associated with the properties of the segment of the digital image at step 115 of method 100, the extracted values are provided to sub process 120 of method 100 where a determination is made of whether the segment of the digital image should be altered.

In other words, sub process 120 of method 100 is a decision process to determine whether the segment of the digital image should be altered in order to reduce ink demand. The decision process may be performed by machine learning, neural network, decision tree, fuzzy logic, and conditional statements, among others. The decision process may depend on the extracted values of the properties and other information about the segment including but not limited to segment properties, collection of other segments, printing paper properties such as color, printing properties, administrator goals and settings. The extracted value of the properties and other information may be concatenated and provided to the decision process as a vector. An output of sub process 120 of method 100 is a determination of whether the segment should be altered.

At step 160 of method 100, and based on the determination at step 120 of method 100, the segment of the digital image can be altered. For each segment determined to require alteration, the segment can be processed to be removed or otherwise changed so that the amount of ink needed to print the segment is reduced. For instance, the segment can be processed in order to reduce the ink demand as much as possible while maintaining segment content fidelity, wherein segment content fidelity simply reflects whether the meaning of the segment is preserved. In another instance, and as will be described later, the segment can be processed in order to reduce the ink demand relative to an ink demand target value. In this instance, the segment content fidelity is not the driving interest.

In an embodiment, the alterations at step 160 of method 100 can include, among others, removing the segment by making the segment transparent, removing the internal segment content while maintaining the edge or contours to indicate an outline of the segment, inverting colors of the segment with respect to the color of the printing paper, and reducing a density of colors of the segment. The alterations at step 160 of method 100 may also include one or more dithering techniques. Moreover, in the event an ink demand target value is provided to method 100, machine learning and/or artificial intelligence can be used to alter the color in the segment in order to achieve the ink demand goal.

After altering the segment of the digital image at step 160 of method 100, and in the case there is only one segment of the digital image, the altered digital image can be sent to a printer for printing.

Figure 3B:
FIG. 3B is an image of a digital image having been processed by a method for altering digital images in printing jobs, according to an exemplary embodiment of the present disclosure.
Figure 3A:
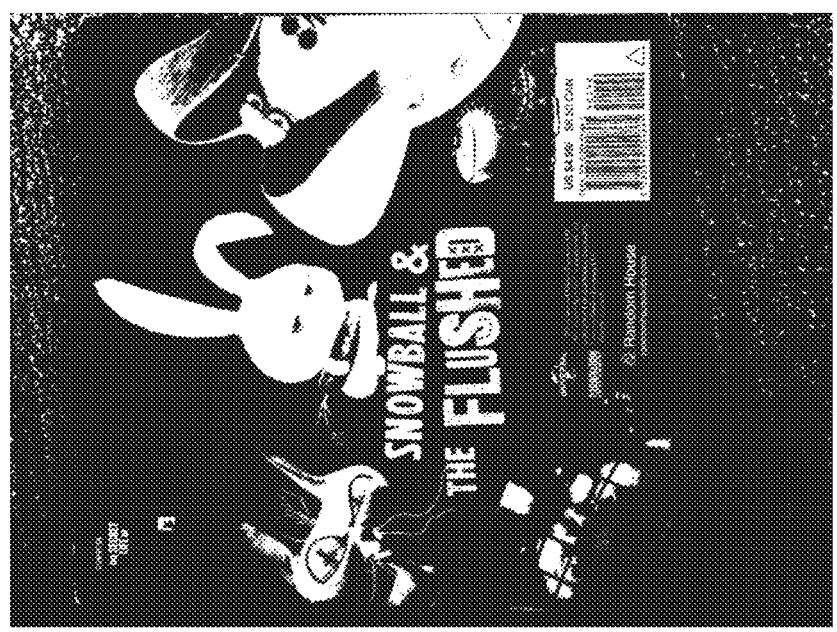
FIG. 3A is an image of a digital image submitted to a method for altering digital images in printing jobs, according to an exemplary embodiment of the present disclosure.

Digital image alterations can be better appreciated with reference to FIG. 3A and FIG. 3B. FIG. 3A is an illustration of a digital image prior to implementation of method 100. FIG. 3B is an illustration of the digital image after implementation of method 100. It can be appreciated that FIG. 3B, which includes multiple segments, has been processed to remove black color in segments of the image where it was not needed and retains edges so that the information within the segments is still conveyed. FIG. 3B illustrates an implementation of a dithering technique.

Figure 4A:
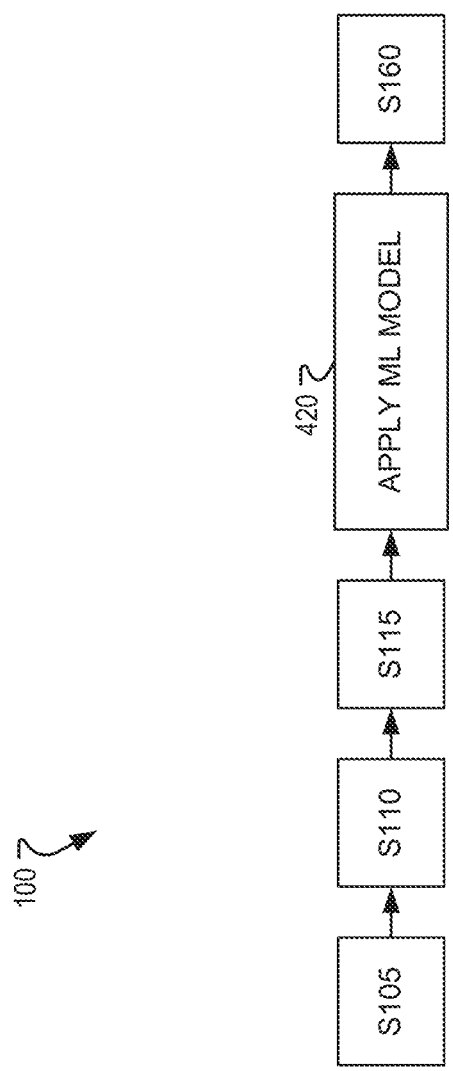
FIG. 4A is a flow diagram of an implementation phase of a method for altering digital images in printing jobs, according to an exemplary embodiment of the present disclosure.

Turning now to FIG. 4A, an exemplary implementation of method 100 will be described.

As in FIG. 1, method 100 begins with receipt of a printing job request from a user of a user device step 105. The received printing job may comprise one or more printable pages that may be documents, images, and the like. In an example, the documents, images, and the like may be received and processed by method 100 in their native formats. In another example, the documents, images, and the like may be received in their native formats and then converted to a common file format before continued processing by method 100. The common file format may be any format that is described above or otherwise considerable, though the common file format may be one that is segmentable by method 100. While a printing job of method 100 can include one or more printable pages, method 100 of FIG. 4A will be described with reference to a single printable page, or digital image.

At step 110 of method 100, segmentation is performed on the digital image of the printing job. The segmentation may be performed by machine learning techniques that include but are not limited to neural networks, convolutional neural networks, deep learning, and reinforcement learning. The segmentation may also be performed by region-based techniques such as watershed and region growing, edge-based methods such as edge detection and active contours, and threshold-based techniques including but not limited to Otsu, multi-level colors, fixed threshold, adaptive threshold, dynamic threshold, and automatic threshold. In an example, the segmentation may be a semantic segmentation. In another example, the segmentation may be a combination of the above described segmentation techniques.

Following segmentation of the digital image at step 110 of method 100, each segment of the digital image can be analyzed at step 115 of method 100 in order to extract properties thereof. Step 115 of method 100 will be described assuming the segmentation resulted in the digital image having only one segment.

The analysis at step 115 of method 100 includes extracting values associated with properties such as, but not limited to, color, area, perimeter, contour, edges, context, curvature, center of mass, contained objects, and shape. The values may be alphanumeric values, text strings, and the like. The properties may further include region to code vector derived according to techniques such as neural networks, deep learning, and the like. The context property can specify the type of information the segment of the digital image contains. The context property types include but are not limited to Text, Graphics, Table, Barcode, and MICR (Magnetic Ink Character Recognition).

Having extracted values associated with the properties of the segment of the digital image at step 115 of method 100, the extracted values are provided to a machine learning model at step 420 of method 100, where a determination is made of whether to alter the segment of the digital image. In an embodiment, the extracted values can be concatenated and provided as a vector to the machine learning model at step 420 of method 100. Step 420 of method 100 is performed by a machine learning model configured to evaluate the extracted values of the properties of the segment of the digital image and generate, based on the evaluation, an output reflecting a probability that the segment satisfies an alteration condition, or alteration criterion, and should thus be altered. An output of step 420 of method 100, accordingly, can be an indication of whether the segment should be altered at step 160 of method 100.

In an embodiment, the machine learning model of step 420 of method 100 can be one that evaluates each of the extracted values of the properties relative to respective alteration criteria. The respective alteration criteria may be defined by the user, defined relative to a use case, and/or defined relative to the specific printing job, among others.

In another embodiment, the machine learning model of step 420 of method 100 can be one that evaluates the extracted values of the properties relative to a global alteration criterion.

In an example, the machine learning model of step 420 of method 100 is a neural network that receives, as inputs, extracted values of the properties of the segment of the digital image, and outputs a probability that the segment is classified as 'alter' or 'not alter', a sufficiently likely value being labeled for alteration. The extracted values of the properties of the segment of the digital image may be concatenated within a vector. Training of the neural network of step 420 of method 100 will be described in greater detail with reference to FIG. 4B.

At step 160 of method 100, and based on the determination at step 420 of method 100, the segment of the digital image can be altered. For each segment determined to require alteration, the contents of the segment can be processed to be removed or otherwise changed so that the amount of ink needed to print the segment is reduced.

In an embodiment, the alterations at step 160 of method 100 can include, among others, removing the segment by, for instance, making the segment transparent, removing the internal segment content while maintaining the edge or contours to indicate an outline of the segment, and dithering. Dithering can include a variety of techniques such as Floyd Stein, Stucki, Burkes, Jarvis, Sierra, Stevenson Arce, Ordered, and Clustered.

In an embodiment, the alterations at step 160 of method 100 can include inverting colors of the segment with respect to the color of the printing paper and reducing a density of colors of the segment.

In an embodiment, a determination of which alteration strategy should be used is based on a desired level of ink demand reduction. To this end, it can be appreciated that the above-described alteration techniques each provide varying levels of ink demand reduction.

In an embodiment, the alterations at step 160 of method 100 can be a manual process or an automatic process. For instance, the user may specify a desired alteration technique. In another instance, the alteration technique may be determined automatically, and a separate machine learning unit can determine, based on segment property values and a target ink demand, an appropriate alteration method for achieving the target ink demand. Such an approach will be described with reference to FIG. 5A.

After altering the segment of the digital image at step 160 of method 100, and in the case there is only one segment of the digital image, the altered digital image can be sent to a printer for printing.

Figure 4B:
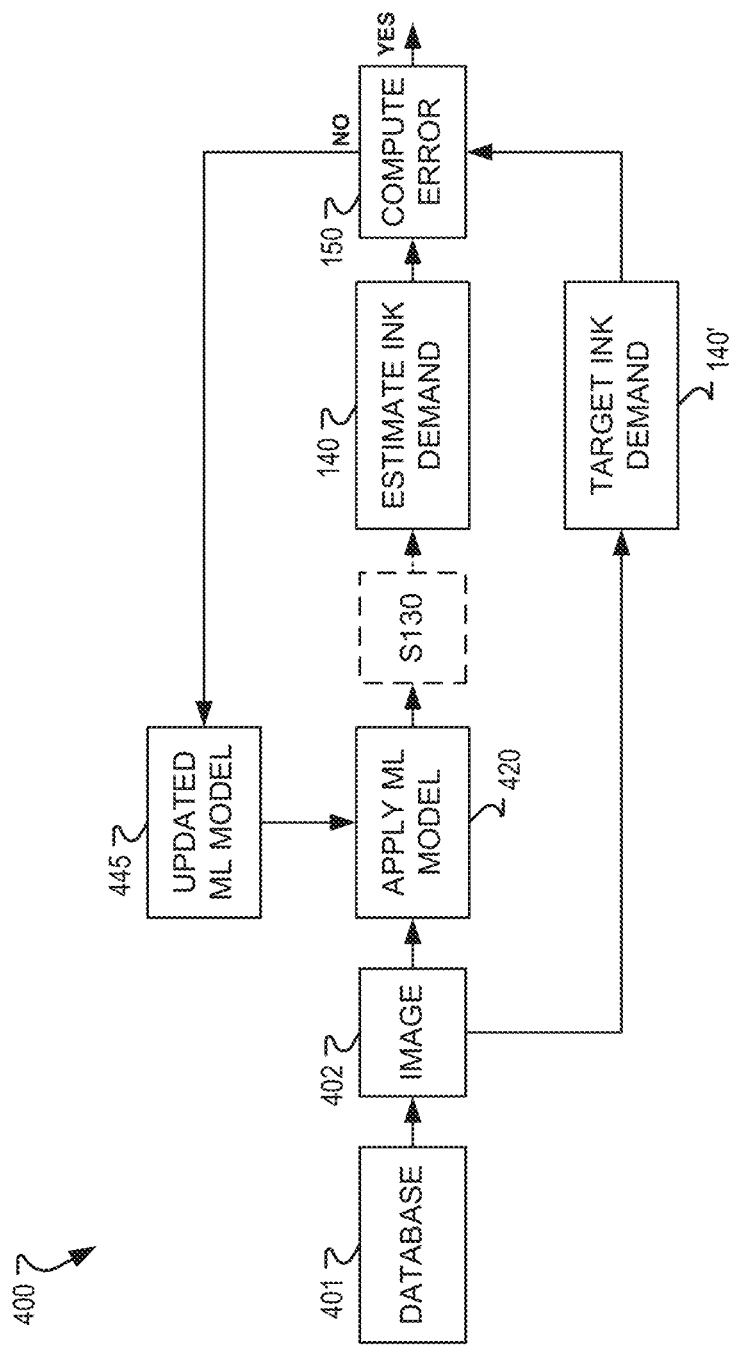
FIG. 4B is a flow diagram of a training phase of a method for altering digital images in printing jobs, according to an exemplary embodiment of the present disclosure.

Turning now to FIG. 4B, an exemplary implementation of a training phase 400 of method 100 will be described.

During the training phase 400, aspects of which are described in greater detail with reference to FIG. 12 through FIG. 15B, digital images are obtained from a database 401 at step 402 of training phase 400. The obtained digital images can then be used for training the machine learning model of method 100. In training phase 400, the obtained digital images are segmented and reference versions of the obtained digital images are labeled digital images. The labels may indicate whether each segment of the digital image should be altered and can include an ink demand target value associated with each segment of the digital image or with the digital image, writ large. In the event the label indicates the reference version of the obtained digital image is altered, the ink demand target value may be further associated with a particular alteration method that has been applied to the reference version of the obtained digital image. As such, during training, the particular alteration method may be applied to a training version of the same obtained digital image in order to accurately train the machine learning model.

As above, a segmented training version of the obtained digital image of training phase 400 of FIG. 4B includes one segment and corresponding labels of the segment includes values of each property of the one segment. Thus, where appropriate, an ink demand target value associated with the digital image can be considered as defining the entire digital image or the one segment thereof.

At step 420 of training phase 400, a machine learning model (ML model) can be applied to the values of the properties of the segment and it can be determined whether an alteration to the segment is needed.

An alteration instruction can be generated at step 130 of training phase 400 based on the determination at step 420 and in accordance with the particular alteration method applied to the reference version of the obtained digital image. Thus, an ink demand of the training version of the obtained digital image can be estimated at step 140 of training phase 400. Concurrently, the ink demand target value associated with the digital image can be received at step 140' of training phase 400.

In an embodiment, the ML model predicts that the training version of the obtained digital image should be altered and the label of the reference version of the obtained digital image similar indicates that the image should be altered. As described above, in such instances, a same particular alteration method may be used for both versions of the obtained digital image.

In another embodiment, the ML model may predict that the training version of the obtained digital image should be altered and the label of the reference version of the obtained digital image may indicate that the image should not be altered. In such an instance, any alteration method may be selected and applied to the training version of the obtained digital image. In an example, a maximal alteration method may be selected and applied to the training version of the obtained digital image. The maximal alteration method may be a complete removal of the segment.

In another embodiment, the ML model may predict that the training version of the obtained digital image should not be altered and the label of the reference version of the obtained digital image may indicate that the image should be altered. In such an instance, no alteration method should be selected or applied to the training version of the obtained digital image.

At step 150 of training phase 400, an error between the ink demand estimated value and the ink demand target value can be calculated. If, in an instance, the error value is less than an error threshold, the machine learning model of training phase 400 satisfies the error threshold and can be applied to a subsequent training image or can be deployed for use in an implementation phase. If, in another instance, the error value is greater than the error threshold, parameters of the machine learning model can be updated at step 445 of training phase 400 and the updated machine learning model can be applied again at step 420 of training phase 400. Subsequently, step 130, step 140, and step 150 can be performed to determine if the updated machine learning model satisfies the error threshold. In the event the updated machine learning model still does not satisfy the error threshold, step 445, step 420, step 130, step 140, and step 150 may be iteratively performed until the error threshold, or ink demand, is satisfied, at which point the machine learning model can be applied to a subsequent training version of a digital image or can be applied in an implementation phase.

In an embodiment, the updates to the machine learning model made at step 445 of training phase 400, aspects of which will be described in later figures, can include changes to the parameters, weights, coefficients, and the like that define the machine learning model.

The above-referenced FIG. 4A and FIG. 4B describe, according to an embodiment of the methods of the present disclosure, an implementation phase and a training phase based on a machine learning model trained to determine whether a segment of a digital image should be altered. In an embodiment, an implementation phase of FIG. 4A can be based solely on the ink demand targets defined during the training phase and are not to be updated in real time according to the user and/or the printable page at hand. FIG. 5A and FIG. 5B, however, describe instances of an implementation phase of the methods of the present disclosure wherein a user defined ink demand target value can be defined in real time and result in real-time updates to aspects of the method.

Figure 5A:
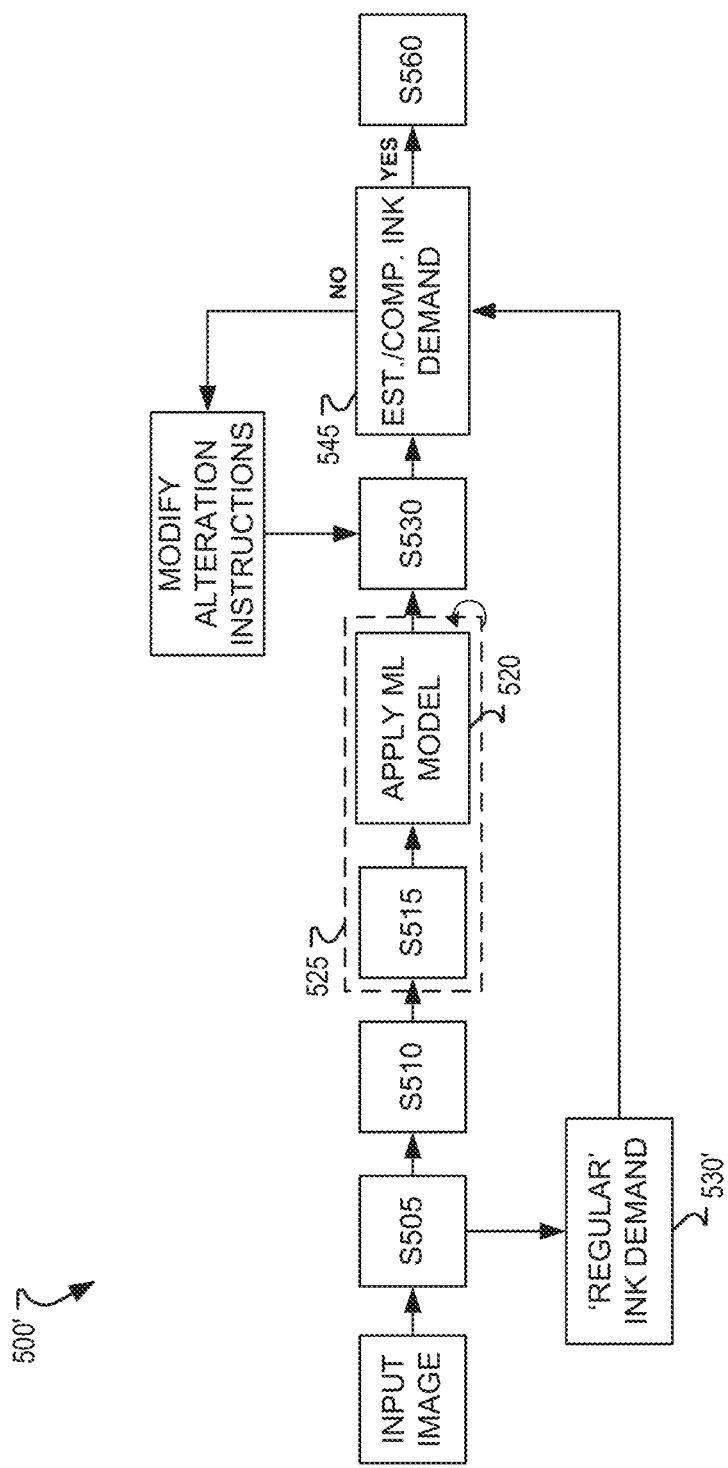
FIG. 5A is a flow diagram of an implementation phase of a method for altering digital images in printing jobs, according to an exemplary embodiment of the present disclosure.
Figure 5B:
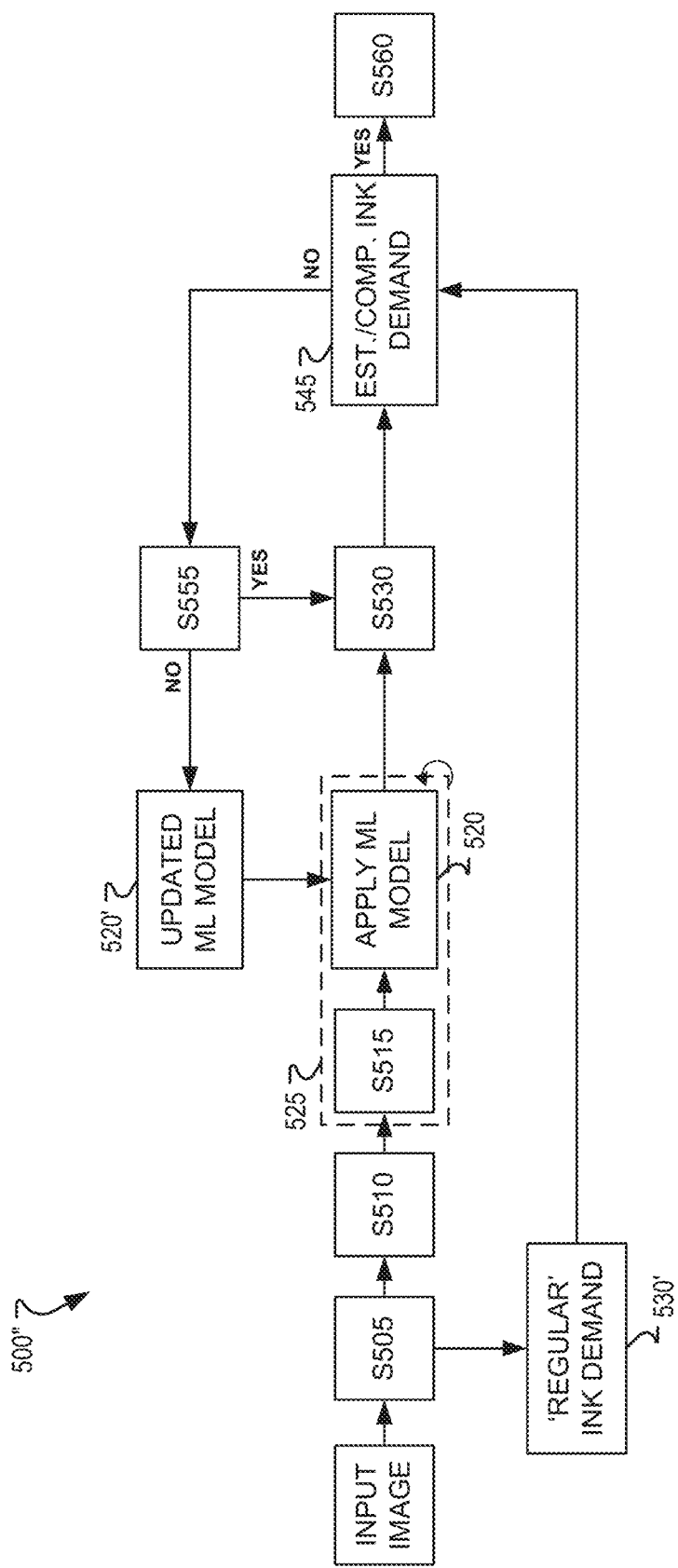
FIG. 5B is a flow diagram of an implementation phase of a method for altering digital images in printing jobs, according to an exemplary embodiment of the present disclosure.

In an embodiment, and in either of FIG. 5A or FIG. 5B, a digital image of a corresponding printing job includes two or more segments. Thus, each method includes an iterative step wherein all segments are considered for alteration prior to proceeding to alteration and printing steps. Moreover, both methods of FIG. 5A and FIG. 5B consider a user defined ink demand threshold that drives fine adjustments to either or both of the machine learning model (FIG. 5B) and an alteration instruction generation step (FIG. 5A/FIG. 5B). In both cases, it can be appreciated that the machine learning model deployed therein has previously been 'coarse'-tuned during a training phase (such as training phase 400 in FIG. 4B) and, in the case of FIG. 5B, can be subsequently, in real-time, 'fine'-tuned during the implementation phase based on the user defined ink demand threshold.

First, with reference to FIG. 5A, method 500' begins at step 505 with receipt of a printing job request from a user of a user device. The printing job request may comprise one or more printable pages, or digital images, that may be documents, images, and the like. The printing job request may include target ink demand, or an ink demand threshold, provided by the user of the user device. In one instance, the ink demand threshold is an ink reduction value. The ink reduction value may indicate, among other goals, a desire of the user to reduce ink demand by a percentage relative to a 'regular' ink demand for the digital image. To this end, a 'regular' ink demand for the digital image can be determined at step 530' of method 500'. The 'regular' ink demand can then be used at step 545 of method 500' to determine if the altered digital image meets the user defined ink demand threshold.

At step 510 of method 500', segmentation is performed on the digital image of the printing job. The segmentation may be performed by machine learning techniques that include but are not limited to neural networks, convolutional neural networks, deep learning, and reinforcement learning. The segmentation may also be performed by region-based techniques such as watershed and region growing, edge-based methods such as edge detection and active contours, and threshold-based techniques including but not limited to Otsu, multi-level colors, fixed threshold, adaptive threshold, dynamic threshold, and automatic threshold. In an example, the segmentation may be a semantic segmentation. In another example, the segmentation may be a combination of the above described segmentation techniques.

Following segmentation of the digital image at step 510 of method 500', each segment of the digital image can be analyzed at sub process 525 of method 500'. Sub process 525 of method 500' can be performed iteratively for each segment of the digital image and includes step 515 and step 520. Though it can be appreciated that the digital image may include a plurality of segments and that sub process 525 of method 500' can be performed iteratively, the following description will be initially provided with reference to a first segment of the digital image.

The analysis at step 515 of method 500' includes extracting values associated with properties of the first segment. The properties can include, but are not limited to, color, area, perimeter, contour, edges, context, curvature, center of mass, contained objects, and shape. The values may be alphanumeric values, text strings, and the like. The properties may further include region to code vector derived according to techniques such as neural networks, deep learning, and the like. The context property can specify the type of information the first segment of the digital image contains. The context property types include but are not limited to Text, Graphics, Table, Barcode, and MICR (Magnetic Ink Character Recognition).

Having extracted values associated with the properties of the first segment of the digital image at step 515 of method 500', the extracted values are provided to a machine learning model at step 520 of method 500', where a determination is made of whether to alter the first segment of the digital image. Step 520 of method 500' is performed by a machine learning model configured to evaluate the extracted values of the properties of the first segment of the digital image and generate, based on the evaluation, an output reflecting a probability that the first segment satisfies an alteration condition, or alteration criterion, and should thus be altered. An output of step 520 of method 500', accordingly, can be an indication of whether the first segment should be altered.

In an embodiment, the machine learning model of step 520 of method 500' can be one that evaluates each of the extracted values of the properties relative to respective alteration criteria. In another embodiment, the machine learning model of step 520 of method 500' can be one that evaluates the extracted values of the properties relative to a global alteration criterion.

In an example, the machine learning model of step 520 of method 500' is a neural network, similar to that described with reference to FIG. 4A, that receives, as inputs, extracted values of the properties of the first segment of the digital image and outputs a probability that the first segment is classified as 'alter' or 'not alter'. The input may be a vector including each of the extracted values of the properties of the first segment of the digital image.

Following determination of whether the first segment should be altered at step 520 of method 500', sub process 525 can be iteratively performed, including step 515 and step 520, until all segments of the digital image have been evaluated.

The evaluated segments can then be assessed at step 530 of method 500' and alteration instructions for the digital image can be generated. Alteration instructions can be generated for each segment determined to satisfy alteration conditions at step 520 of method 500'. As will be described below, the alteration instructions may be selected manually, automatically, or a combination thereof.

In an embodiment, the alteration instructions may be selected manually. The alteration instructions may include removing or otherwise changing a segment in order to reduce an ink demand in the segment. Further, the alteration instructions may include removing the segment by making the segment transparent, removing the internal segment content while maintaining the edge or contours to indicate an outline of the segment, inverting colors of the segment with respect to the color of the printing paper, and reducing a density of colors of the segment. In one instance, the alteration instructions may be generated based on values of properties of each segment and based on administrator-defined or printer-defined constraints, such as printing paper quality, printing paper color, and printer resolution.

At step 545 of method 500', the manually-selected alteration instructions may be used to estimate an ink demand of the altered digital image. Subsequently, still at step 545 of method 500', the estimated ink demand of the altered digital image can be compared to the user defined ink demand threshold to determine if the altered digital image satisfies this constraint. To this end, the estimated ink demand of the altered digital image can be compared to the 'regular' ink demand expected for the unaltered digital image (generated at step 530' of method 500') and the difference can be compared to the user defined ink demand threshold. If the estimated ink demand of the altered digital image satisfies the user defined ink demand threshold, the generated alteration instructions can be provided to step 560 of method 500' and the digital image can be altered, accordingly. If, however, the estimated ink demand of the altered digital image does not satisfy the user defined ink demand threshold, method 500' proceeds to step 530' and the alteration instructions may be updated, which may include querying the user to receive a new selection regarding the alteration method. After receiving an updated alteration instruction at step 530 of method 500', step 545 of method 500' may be performed again. Following selection of an alteration method that results in an estimated ink demand of the updated altered digital image that satisfies the ink demand threshold, method 500' may proceed to step 560 of method 500' and the alterations may be performed.

In another embodiment, the alteration instructions may be selected automatically. As the training process of method 500' may be iterative, it can be appreciated that the automatic selection of the alteration instruction may be iterative, if necessary. As above, the alteration instructions may include removing the segment by making the segment transparent, removing the internal segment content while maintaining the edge or contours to indicate an outline of the segment, inverting colors of the segment with respect to the color of the printing paper, and reducing a density of colors of the segment. In one instance, the alteration instructions may be generated based on values of properties of each segment and based on administrator-defined or printer-defined constraints, such as printing paper quality, printing paper color, and printer resolution. Moreover, the alteration instructions may include dithering techniques such as Floyd Stein, Stucki, Burkes, Jarvis, Sierra, Stevenson Arce, Ordered, and Clustered.

The automated and iterative alteration instruction selection process may be performed in a graduated manner. For instance, for each segment at step 530 of method 500' requiring alteration, a first alteration instruction may be a least altering instruction. In an example, a dithering technique may be selected as the first alteration instruction. Accordingly, at step 545 of method 500', an estimated ink demand may be calculated based on the first alteration instruction and, in the event the estimated ink demand does not satisfy the ink demand threshold, the alteration instructions may be modified. The alteration instruction modification may result in selection of a second alteration instruction at step 530 of method 500'. The second alteration instruction may be a next least altering instruction. In an example, the second alteration instruction may include removing a segment area while maintaining a contour/outline of the segment area. It can be appreciated that such a method can be repeated until the ink demand threshold is satisfied. In this way, minimal changes are made to the digital image while satisfying the user defined goals.

In an example, the automated and iterative alteration instruction selection process may include evaluating an amount of available ink and selecting an alteration technique that will satisfy the given ink constraint.

Method 500' is completed when the altered digital image satisfies the user defined ink demand threshold and the satisfactory alteration instructions are executed at step 560 of method 500'. The altered digital images can then be provided to the printer for printing.

While FIG. 5A provides the ability for adjustments to the alteration instructions in the implementation phase, FIG. 5B provides the ability for 'fine'-tuned adjustments to the machine learning model and adjustments to the alteration instructions in the implementation phase.

Method 500" of FIG. 5B begins at step 505 with receipt of a printing job request from a user of a user device. The printing job request may comprise one or more printable pages, or digital images, that may be documents, images, and the like. The printing job request may include an ink demand threshold provided by the user of the user device. In one instance, the ink demand threshold is an ink reduction value. The ink reduction value may indicate, in one instance, a desire of the user to reduce ink demand by a percentage relative to a 'regular' ink demand for the digital image. To this end, a 'regular' ink demand for the digital image can be determined at step 530' of method 500". The 'regular' ink demand can then be used at step 545 of method 500" to determine if the altered digital image meets the user defined ink demand threshold.

At step 510 of method 500", segmentation is performed on the digital image of the printing job. The segmentation may be performed by machine learning techniques that include but are not limited to neural networks, convolutional neural networks, deep learning, and reinforcement learning. The segmentation may also be performed by region-based techniques such as watershed and region growing, edge-based methods such as edge detection and active contours, and threshold-based techniques including but not limited to Otsu, multi-level colors, fixed threshold, adaptive threshold, dynamic threshold, and automatic threshold. In an example, the segmentation may be a semantic segmentation. In another example, the segmentation may be a combination of the above described segmentation techniques.

Following segmentation of the digital image at step 510 of method 500", each segment of the digital image can be analyzed at sub process 525 of method 500". Sub process 525 of method 500" can be performed iteratively for each segment of the digital image and includes step 515 and step 520. The following description will be initially provided with reference to a first segment of the digital image.

The analysis at step 515 of method 500″ includes extracting values associated with properties of the first segment. The properties can include, but are not limited to, color, area, perimeter, contour, edges, context, curvature, center of mass, contained objects, and shape. The values may be alphanumeric values, text strings, and the like. The properties may further include region to code vector derived according to techniques such as neural networks, deep learning, and the like. The context property can specify the type of information the first segment of the digital image contains. The context property types include but are not limited to Text, Graphics, Table, Barcode, and MICR (Magnetic Ink Character Recognition).

Having extracted values associated with the properties of the first segment of the digital image at step 515 of method 500″, the extracted values are provided to a machine learning model at step 520 of method 500″, where a determination is made of whether to alter the first segment of the digital image. Step 520 of method 500″ is performed by a machine learning model configured to evaluate the extracted values of the properties of the first segment of the digital image and generate, based on the evaluation, an output reflecting a probability that the first segment satisfies an alteration condition, or alteration criterion, and should thus be altered. An output of step 520 of method 500″, accordingly, can be an indication of whether the first segment should be altered.

In an embodiment, the machine learning model of step 520 of method 500″ can be one that evaluates each of the extracted values of the properties relative to respective alteration criteria. In another embodiment, the machine learning model of step 520 of method 500″ can be one that evaluates the extracted values of the properties relative to a global alteration criterion.

In an example, the machine learning model of step 520 of method 500″ is a neural network, similar to that described with reference to FIG. 4A, that receives, as inputs, extracted values of the properties of the first segment of the digital image and outputs a probability that the first segment is classified as 'alter' or 'not alter'. The input may be a vector including the extracted values of the properties of the first segment of the digital image.

Following determination of whether first the first segment should be altered at step 520 of method 500″, sub process 525 can be iteratively performed, including step 515 and step 520, until all segments of the digital image have been evaluated.

The evaluated segments can then be assessed at step 530 of method 500″ and alteration instructions for the digital image can be generated. Alteration instructions can be generated for each segment determined to satisfy alteration conditions at step 520 of method 500″. As will be described below, the alteration instructions may be selected manually, automatically, or a combination thereof.

In an embodiment, the alteration instructions may be selected manually. The alteration instructions may include removing or otherwise changing a segment in order to reduce an ink demand in the segment. Further, the alteration instructions may include removing the segment by making the segment transparent, removing the internal segment content while maintaining the edge or contours to indicate an outline of the segment, inverting colors of the segment with respect to the color of the printing paper, and reducing a density of colors of the segment. In one instance, the alteration instructions may be generated based on values of properties of each segment and based on administrator-defined or printer-defined constraints, such as printing paper quality, printing paper color, and printer resolution.

At step 545 of method 500″, the manually-selected alteration instructions may be used to estimate an ink demand of the altered digital image. Subsequently, still at step 545 of method 500″, the estimated ink demand of the altered digital image can be compared to the user defined ink demand threshold to determine if the altered digital image satisfies this constraint. To this end, the estimated ink demand of the altered digital image can be compared to the 'regular' ink demand expected for the unaltered digital image (generated at step 530' of method 500″) and the difference can be compared to the user defined ink demand threshold. If the estimated ink demand of the altered digital image satisfies the user defined ink demand threshold, the generated alteration instructions can be provided to step 560 of method 500″ and the digital image can be altered, accordingly. If, however, the estimated ink demand of the altered digital image does not satisfy the user defined ink demand threshold, method 500″ proceeds to step 555.

In an embodiment, step 555 of method 500″ includes an evaluation of whether the alteration instructions can be updated, which may include querying the user to receive a new selection regarding the alteration method, or whether fine adjustments must be made to the ML model at step 520' of method 500″. For instance, the evaluation may include determining whether additional alteration instructions are available that will further reduce the ink demand of the digital image. Assuming additional alteration instructions can be applied to the digital image, the user may be queried for such a selection. This process is similar to that followed in FIG. 5A. However, in the event no additional alteration instructions are available, indicating that the ink demand threshold cannot be satisfied by alteration instructions alone, method 500″ proceeds to step 520' and fine adjustments may be made to the ML model. The updates to the machine learning model necessitate that each segment of the digital image is reevaluated during sub process 525. However, with iteration of method 500″, wherein the machine learning model is updated at step 520', the estimated ink demand of the altered digital image should become closer to satisfying the user defined ink demand threshold relative to the 'regular' ink demand. In an embodiment, the updates to the ML model made at step 520' of method 500″ can include changes to the parameters, weights, coefficients, and the like that define the ML model. The updates to the ML model may be such that the ML model more readily indicates that a segment of the digital image requires alteration.

In an instance, the adjustments to the ML model can be performed in view of a segment content fidelity value that ensures the content within the segment still conveys the corresponding information. In another instance, the updates to the ML model are made only in order to reduce the estimated ink demand of the altered digital image so that it satisfies the user defined ink demand threshold.

Once the ML model is updated at step 520' of method 500″, sub process 525 can be again performed for each segment of the digital image. For segments that satisfy the alteration threshold, alteration instructions can be generated at step 530 of method 500″. In the event that the ML model has been updated, the alteration instruction at step 530 of method 500″ may be, initially, a least altering one of the alteration techniques.

After again receiving alteration instructions at step 530 of method 500″, step 545 of method 500″ may be performed.

Assuming that the updates to the ML model, and the alteration instructions applied thereto, generated alterations that result in satisfactory ink demand, method 500" may proceed to step 560 and the digital image may be altered.

In another embodiment, the alteration instructions may be selected automatically. As the training process of method 500" may be iterative, it can be appreciated that the automatic selection of the alteration instruction may as well be iterative, if necessary. As above, the alteration instructions may include removing the segment by making the segment transparent, removing the internal segment content while maintaining the edge or contours to indicate an outline of the segment, inverting colors of the segment with respect to the color of the printing paper, and reducing a density of colors of the segment. In one instance, the alteration instructions may be generated based on values of properties of each segment and based on administrator-defined or printer-defined constraints, such as printing paper quality, printing paper color, and printer resolution. Moreover, the alteration instructions may include dithering techniques such as Floyd Stein, Stucki, Burkes, Jarvis, Sierra, Stevenson Arce, Ordered, and Clustered.

The automated and iterative alteration instruction selection process may be performed in a graduated manner. For instance, for each segment at step 530 of method 500" requiring alteration, a first alteration instruction may be a least altering instruction. In an example, a dithering technique may be selected as the first alteration instruction. Accordingly, at step 545 of method 500", an estimated ink demand may be calculated based on the first alteration instruction. In the event the estimated ink demand does not satisfy the ink demand threshold, method 500" may proceed to step 555.

As introduced, at step 545 of method 500", the alteration instructions may be used to estimate an ink demand of the altered digital image. Subsequently, still at step 545 of method 500", the estimated ink demand of the altered digital image can be compared to the user defined ink demand threshold to determine if the altered digital image satisfies this constraint. To this end, the estimated ink demand of the altered digital image can be compared to the 'regular' ink demand expected for the unaltered digital image (generated at step 530' of method 500") and the difference can be compared to the user defined ink demand threshold. If the estimated ink demand of the altered digital image satisfies the user defined ink demand threshold, the generated alteration instructions can be provided to step 560 of method 500" and the digital image can be altered, accordingly. If, however, the estimated ink demand of the altered digital image does not satisfy the user defined ink demand threshold, method 500" proceeds to step 555.

In an embodiment, step 555 of method 500" includes an evaluation of whether the alteration instructions can be updated, which may include determining if another alteration technique exists, or whether fine adjustments must be made to the ML model at step 520' of method 500". For instance, the evaluation may include determining whether additional alteration instructions are available that will further reduce the ink demand of the digital image. This determination may be based on an instant analysis or based on a ranking of the alteration techniques from a least altering to a most altering. In the event an additional alteration technique is available, automatic selection of a second alteration instruction may be performed at step 555 of method 500". The second alteration instruction may be a next least altering instruction. In an example, the second alteration instruction may include removing a segment area while maintaining a contour/outline of the segment area. It can be appreciated that such an iterative method can be repeated in an effort to satisfy the ink demand threshold. In this way, minimal changes are made to the digital image while satisfying the user defined goals. This process is similar to that described with reference to FIG. 5A.

In an example, the automated and iterative alteration instruction selection process may include evaluating an amount of available ink and selecting an alteration technique that will satisfy the given ink constraint.

However, in the event no additional alteration instructions are available (i.e., no more alternating technique is available), indicating that the ink demand threshold cannot be satisfied by alteration instructions alone, method 500" proceeds to step 520' and fine adjustments may be made to the ML model. The updates to the machine learning model necessitate that each segment of the digital image is reevaluated during sub process 525. However, with iteration of method 500", wherein the machine learning model is updated at step 520', the estimated ink demand of the altered digital image should become closer to satisfying the user defined ink demand threshold relative to the 'regular' ink demand. In an embodiment, the updates to the ML model made at step 520' of method 500" can include changes to the parameters, weights, coefficients, and the like that define the ML model. The updates to the ML model may be such that the ML model more readily indicates that a segment of the digital image requires alteration.

In an instance, the adjustments to the ML model can be performed in view of a segment content fidelity value that ensures the content within the segment still conveys the corresponding information. In another instance, the updates to the ML model are made only in order to reduce the estimated ink demand of the altered digital image so that it satisfies the user defined ink demand threshold.

Once the ML model is updated at step 520' of method 500", sub process 525 can be again performed for each segment of the digital image. For segments that satisfy the alteration threshold, alteration instructions can be generated at step 530 of method 500". In the event that the ML model has been updated, the alteration instruction at step 530 of method 500" may be, initially, a least altering one of the alteration techniques, as was described with respect to the automatic selection method.

After again receiving alteration instructions at step 530 of method 500", step 545 of method 500" may be performed. Assuming that the updates to the ML model, and the alteration instructions applied thereto, generated alteration instructions that result in satisfactory ink demand, method 500" may proceed to step 560 and the digital image may be altered. Otherwise, method 500" returns to step 555 and iterative changes to the ML model and/or the alteration instructions can be made.

Method 500", as described in FIG. 5B, is completed when the altered digital image satisfies the user defined ink demand threshold and the satisfactory alteration instructions are executed at step 560 of method 500". The altered digital images can then be provided to the printer for printing.

FIG. 6A through FIG. 9C provide illustrations of digital images at each step of the above-described methods.

Figure 6A:
FIG. 6A is an illustration of a digital image submitted to a method for altering digital images in printing jobs, according to an exemplary embodiment of the present disclosure.
Figure 6B:
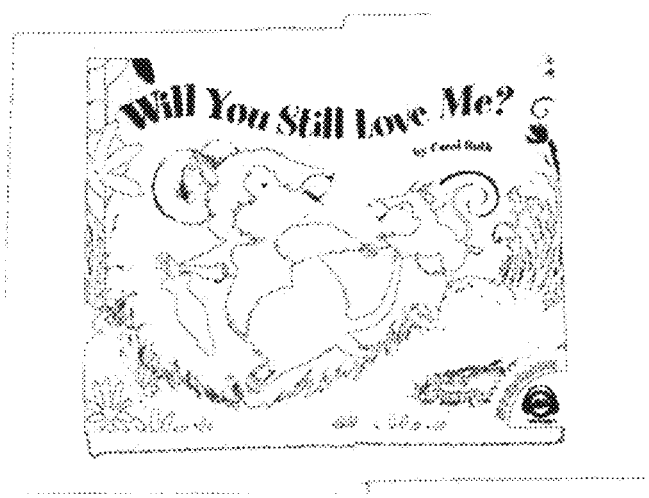
FIG. 6B is an illustration of a digital image submitted to a method for altering digital images in printing jobs according to an edge method, according to an exemplary embodiment of the present disclosure.
Figure 6C:
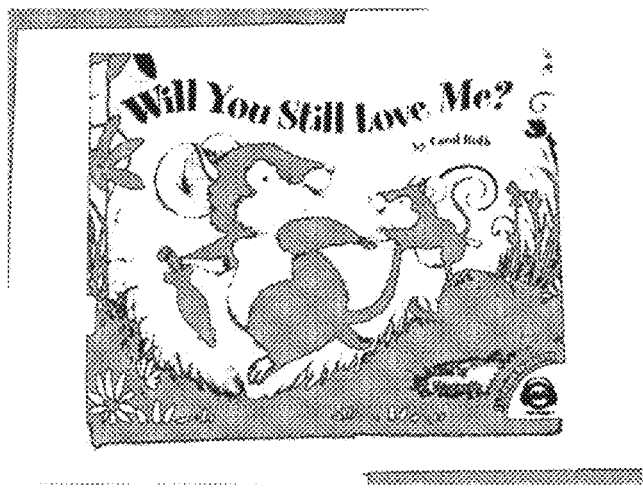
FIG. 6C is an illustration of a digital image submitted to a method for altering digital images in printing jobs according to a Dither method, according to an exemplary embodiment of the present disclosure.

For instance, FIG. 6A provides an illustration of a raw digital image. FIG. 6B provides an illustration of the same image processed according to alteration instructions that remove a segment area while maintaining edges thereof, according to methods of the present disclosure. FIG. 6C provides an illustration of the same image processed according to alteration instructions including a Dither method, according to method of the present disclosure.

Figure 7C:
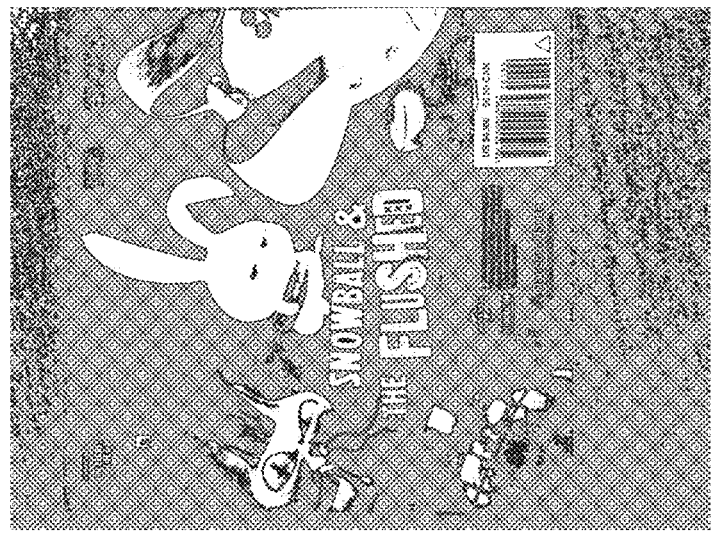
FIG. 7C is an illustration of a digital image submitted to a method for altering digital images in printing jobs according to a Dither method, according to an exemplary embodiment of the present disclosure.
Figure 7B:
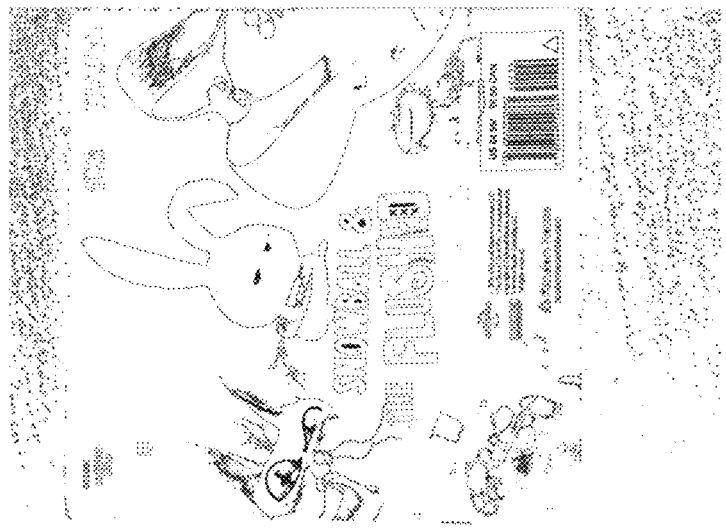
FIG. 7B is an illustration of a digital image submitted to a method for altering digital images in printing jobs according to an edge method, according to an exemplary embodiment of the present disclosure.
Figure 7A:
FIG. 7A is an illustration of a digital image submitted to a method for altering digital images in printing jobs, according to an exemplary embodiment of the present disclosure.

Similarly, FIG. 7A provides an illustration of a raw digital image. FIG. 7B provides an illustration of the same image processed according to alteration instructions that remove a segment area while maintaining edges thereof, according to methods of the present disclosure. FIG. 7C provides an illustration of the same image processed according to alteration instructions including a Dither method, according to method of the present disclosure.

Figure 8C:
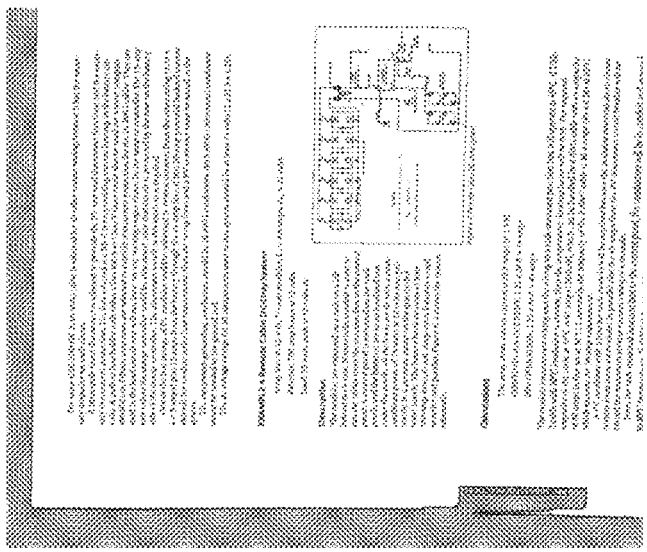
FIG. 8C is an illustration of a digital image submitted to a method for altering digital images in printing jobs according to a Dither method, according to an exemplary embodiment of the present disclosure.
Figure 8B:
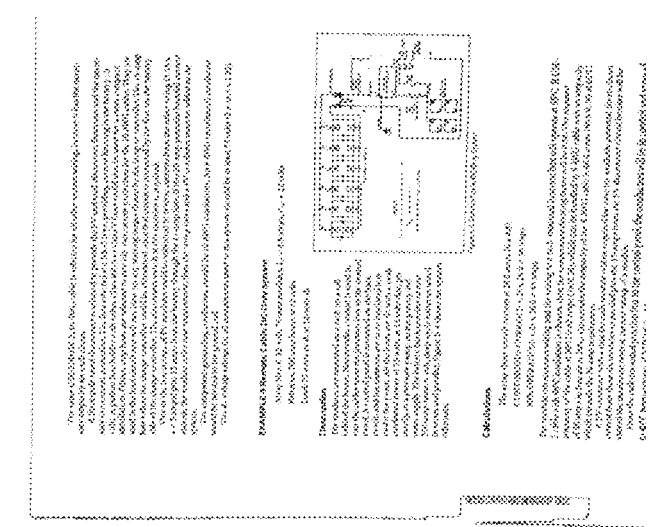
FIG. 8B is an illustration of a digital image submitted to a method for altering digital images in printing jobs according to an edge method, according to an exemplary embodiment of the present disclosure.
Figure 8A:
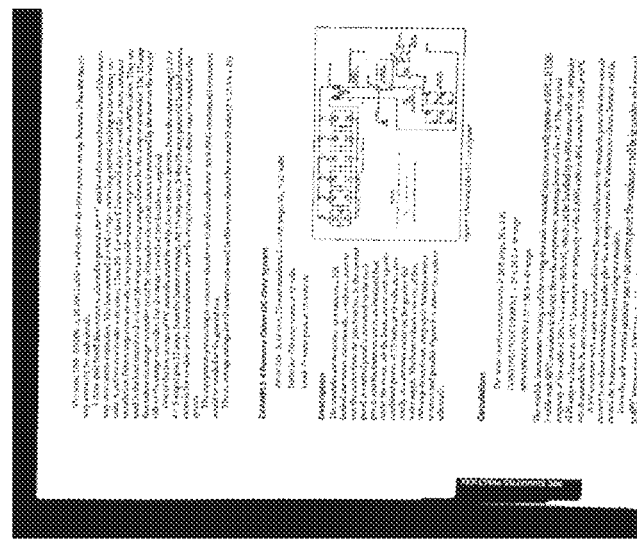
FIG. 8A is an illustration of a digital image submitted to a method for altering digital images in printing jobs, according to an exemplary embodiment of the present disclosure.

Further, for instance, FIG. 8A provides an illustration of a raw digital image. FIG. 8B provides an illustration of the same image processed according to alteration instructions that remove a segment area while maintaining edges thereof, according to methods of the present disclosure. FIG. 8C provides an illustration of the same image processed according to alteration instructions including a Dither method, according to method of the present disclosure.

Figures 9A, 9B, 9C:
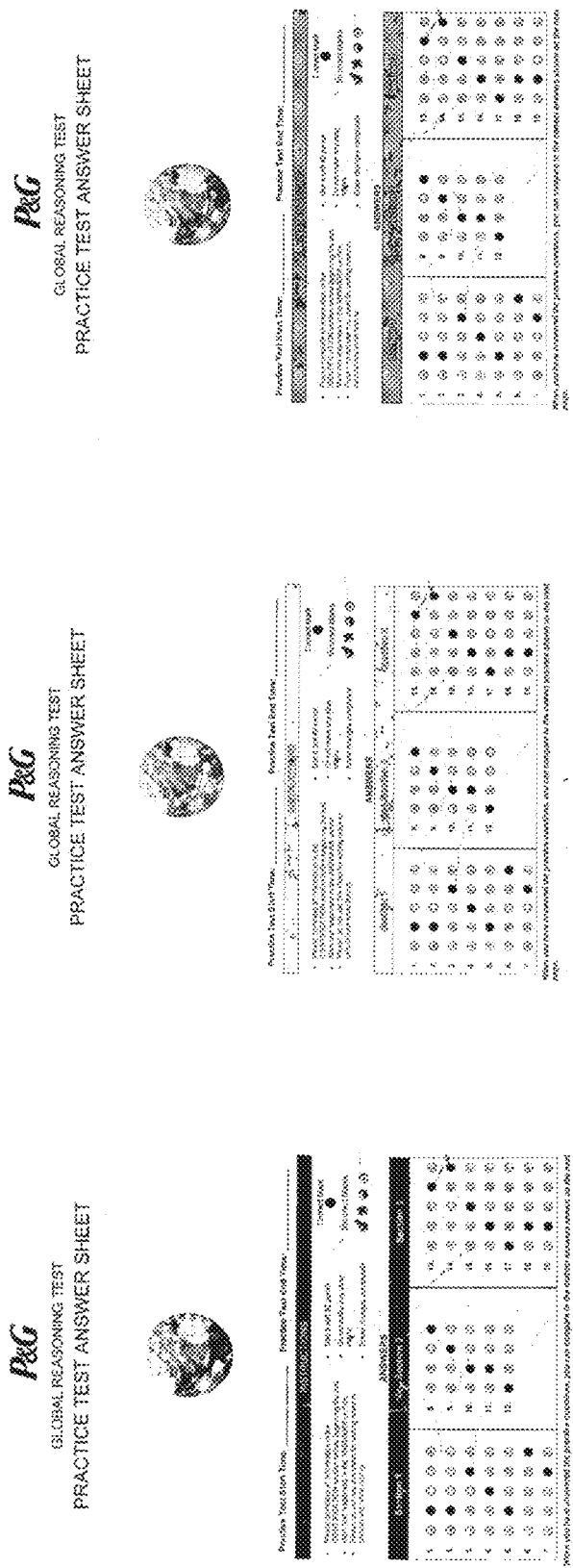
FIG. 9A is an illustration of a digital image submitted to a method for altering digital images in printing jobs, according to an exemplary embodiment of the present disclosure.
FIG. 9B is an illustration of a digital image submitted to a method for altering digital images in printing jobs according to an edge method, according to an exemplary embodiment of the present disclosure.
FIG. 9C is an illustration of a digital image submitted to a method for altering digital images in printing jobs according to a Dither method, according to an exemplary embodiment of the present disclosure.

Lastly, FIG. 9A provides an illustration of a raw digital image. FIG. 9B provides an illustration of the same image processed according to alteration instructions that remove a segment area while maintaining edges thereof, according to methods of the present disclosure. FIG. 9C provides an illustration of the same image processed according to alteration instructions including a Dither method, according to method of the present disclosure.

Embodiments of the subject matter and the functional operations described in this specification can be implemented in digital electronic circuitry, in tangibly embodied computer Software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, Software, a software application, a module, a software module, a script, or code, can be written in any form of programming language, including compiled or interpreted languages, or declarative or procedural languages, and it can be deployed in any form, including as a stand-alone program or as a module, component, Subroutine, or other unit Suitable for use in a computing environment. A computer program may, but need not, correspond to a file in a file system. A program can be stored in a portion of a file that holds other programs or data, e.g., one or more Scripts stored in a markup language document, in a single file dedicated to the program in question, or in multiple coordinated files, e.g., files that store one or more modules, Sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have Such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be Supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more Such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 10:
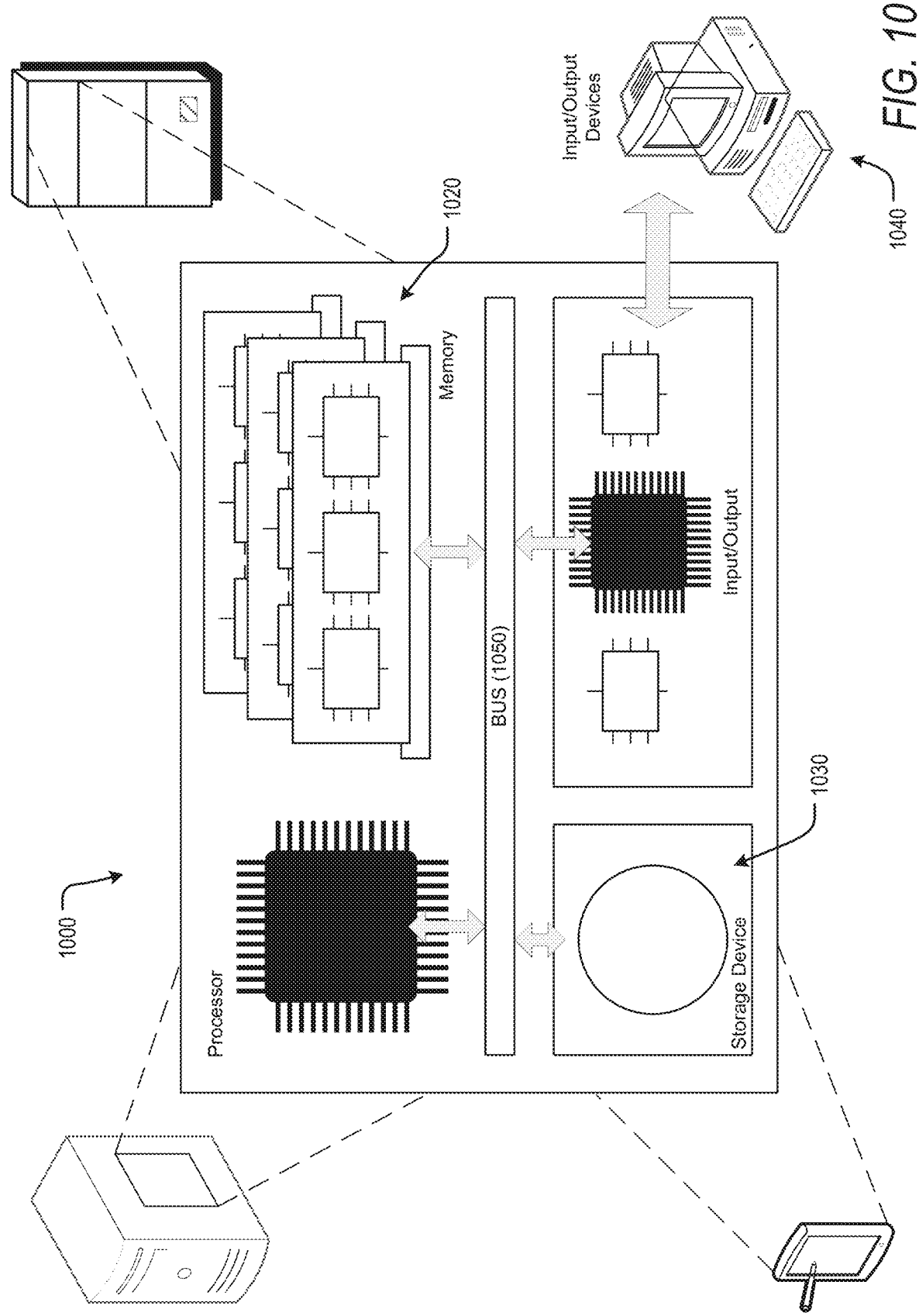
FIG. 10 is a schematic of a hardware configuration of an apparatus for performing a method of altering digital images in printing jobs, according to an exemplary embodiment of the present disclosure.

An example of one such type of computer is shown in FIG. 10, which shows a schematic diagram of a generic computer system 1000. The system 1000 can be used for the operations described in association with any of the computer-implement methods described previously, according to one implementation. The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 1000. In one implementation, the storage device 1030 is a computer-readable medium. In various different implementations, the storage device 1030 may be a floppy disk device, a hard disk device, an optical disk device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

The training of the machine learning model, described above with reference to FIG. 4B, will now be described in greater detail with reference to FIG. 11 through FIG. 14B.

Figure 11:
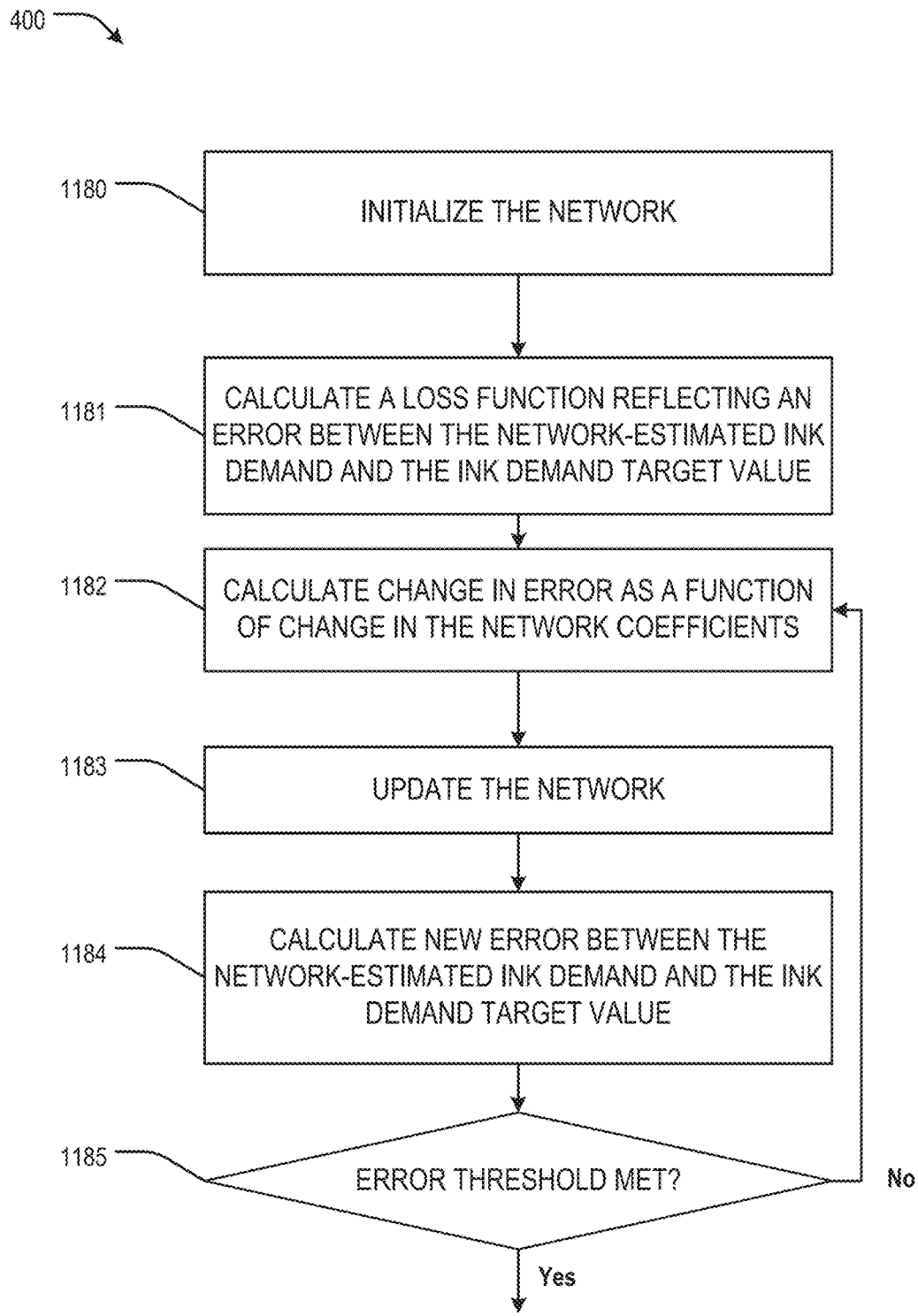
FIG. 11 is a flow diagram of training of a neural network, according to an exemplary embodiment of the present disclosure.

FIG. 11, for instance, shows a flow diagram of one implementation of training phase 400, wherein the machine learning model is a convolutional neural network (CNN). In training phase 400, labeled datasets including ink demand target values are used as training data to train the CNN, resulting in the CNN being output from step 1185. The term "data" here can refer to a digital image of the training image database and associated labels. In an example using training images for data, the offline training method of process 400 trains the CNN using a large number of training images, which may be any digital images of hypothetical printing jobs, that are 'labeled' in order to train the CNN to determine alterations such that the ink demand target value may be achieved. The digital images may have multiple labels assigned to different properties of multiple segments. Thus, it can be appreciated that the labels assigned to different properties of a given segment are inputs to the CNN, though it may be referred to below that the digital images are the input.

In training phase 400, a training database is accessed to obtain a plurality of datasets and the network is iteratively updated to reduce the error (e.g., the value produced by a loss function) between an estimated ink demand of the altered digital image and an ink demand target value relative to a 'regular' ink demand of the unaltered digital image, wherein updating the network includes iteratively updating values of, for example, network coefficients, at each layer of the CNN, such that an output based on the data processed by the CNN, increasingly, matches the 'ink demand target value' generated by the reference data.

In other words, CNN infers the mapping implied by the training data, and the cost function produces an error value related to the mismatch between the ink demand target value and the estimated ink demand of the altered digital image of the current iteration of the CNN. For example, in certain implementations, the cost function can use the mean-square error to minimize the average squared error. In the case of a multilayer perceptron (MLP) neural network, the back-propagation algorithm can be used for training the network by minimizing the mean-square-error-based cost function using a (stochastic) gradient descent method. A more-detailed discussion of updating of network coefficients can be found below with reference to FIG. 12.

Training a neural network model essentially means selecting one model from the set of allowed models (or, in a Bayesian framework, determining a distribution over the set of allowed models) that minimizes the cost criterion (i.e., the error value calculated using the cost function). Generally, the CNN can be trained using any of numerous algorithms for training neural network models (e.g., by applying optimization theory and statistical estimation).

For example, the optimization method used in training the CNN can use a form of gradient descent incorporating backpropagation to compute the actual gradients. This is done by taking the derivative of the cost function with respect to the network parameters and then changing those parameters in a gradient-related direction. The backpropagation training algorithm can be: a steepest descent method (e.g., with variable learning rate, with variable learning rate and momentum, and resilient backpropagation), a quasi-Newton method (e.g., Broyden-Fletcher-Goldfarb-Shanno, one step secant, and Levenberg-Marquardt), or a conjugate gradient method (e.g., Fletcher-Reeves update, Polak-Ribiére update, Powell-Beale restart, and scaled conjugate gradient). Additionally, evolutionary methods, such as gene expression programming, simulated annealing, expectation-maximization, non-parametric methods and particle swarm optimization, can also be used for training the CNN.

With reference now to FIG. 11, the flow diagram is a non-limiting example of an implementation of training phase 400 for training the CNN using the training data. The data in the training data can be from any of the training datasets within the training database.

In step 1180 of training phase 400, an initial guess is generated for the coefficients of the CNN. For example, the initial guess can be based on a priori knowledge of the digital image or one or more exemplary edge-detection methods and/or blob detection methods. Additionally, the initial guess can be based on one of the LeCun initialization, an Xavier initialization, and a Kaiming initialization.

Step 1181 through step 1185 of FIG. 11 provides a non-limiting example of an optimization method for training the CNN. First, it should be appreciated that an output of the CNN is a determination of whether a given digital should be modified. Accordingly, the ink demand estimation is made based on alteration instructions that are derived from the CNN determination. For simplicity, the error referenced above and calculated below will be described with respect to the modified output of the CNN.

In step 1185 of training phase 400, an error is calculated (e.g., using a loss function or a cost function) to represent a measure of the difference (e.g., a distance measure) between an ink demand target value and the modified output data of the CNN as applied in a current iteration of the CNN. The error can be calculated using any known cost function or distance measure between the ink demand data, including those cost functions described above. Further, in certain implementations the error/loss function can be calculated using one or more of a hinge loss and a cross-entropy loss. In an example, as described above, the loss function can be defined as the mean square error between the modified output of the CNN ($ink_{CNN}$) and the labeled ink demand target value data ($ink_{true}$), or $$\frac{1}{n}\sum_{i=1}^{n}(ink_{true} - ink_{CNN})^2$$

where n is the number for the training object. As described above, this loss can be minimized using optimization methods including, among others, stochastic gradient descent.

Additionally, the loss function can be combined with a regularization approach to avoid overfitting the network to the particular instances represented in the training data. Regularization can help to prevent overfitting in machine learning problems. If trained too long, and assuming the model has enough representational power, the network will learn the features specific to that dataset, which is referred to as overfitting. In case of overfitting, the CNN becomes a poor generalization, and the variance will be large because the features vary between datasets. The minimum total error occurs when the sum of bias and variance are minimal. Accordingly, it is desirable to reach a local minimum that explains the data in the simplest possible way to maximize the likelihood that the trained network represents a general solution, rather than a solution particular to the features in the training data. This goal can be achieved by, for example, early stopping, weight regularization, lasso regularization, ridge regularization, or elastic net regularization.

In certain implements the CNN is trained using backpropagation. Backpropagation can be used for training neural networks and is used in conjunction with gradient descent optimization methods. During a forward pass, the algorithm computes the network's prediction based on the current parameters, which may be, for instance, weights/coefficients. The estimated ink demand can then be input into the loss function, by which it is compared to a corresponding ground truth label (i.e., ink demand target value). During the backward pass, the model computes the gradient of the loss function with respect to the current parameters, after which the parameters are updated by taking a step size of a predefined size in the direction of minimized loss (e.g., in accelerated methods, such that the Nesterov momentum method and various adaptive methods, the step size can be selected to more quickly converge to optimize the loss function.

The optimization method by which the backprojection is performed can use one or more of gradient descent, batch gradient descent, stochastic gradient descent, and mini-batch stochastic gradient descent. Additionally, the optimization method can be accelerated using one or more momentum update techniques in the optimization approach that results in faster convergence rates of stochastic gradient descent in deep networks, including, e.g., Nesterov momentum technique or an adaptive method, such as Adagrad sub-gradient method, an Adadelta or RMSProp parameter update variation of the Adagrad method, and an Adam adaptive optimization technique. The optimization method can also apply a second order method by incorporating the Jacobian matrix into the update step.

The forward and backward passes can be performed incrementally through the respective layers of the network. In the forward pass, the execution starts by feeding the inputs through the first layer, thus creating the output activations for the subsequent layer. This process is repeated until the loss function at the last layer is reached. During the backward pass, the last layer computes the gradients with respect to its own learnable parameters (if any) and also with respect to its own input, which serves as the upstream derivatives for the previous layer. This process is repeated until the input layer is reached.

Returning to the non-limiting example shown in FIG. 11, step 1182 of training phase 400 determines a change in the error as a function of the change in the network can be calculated (e.g., an error gradient) and this change in the error can be used to select a direction and step size for a subsequent change in the weights/coefficients of the CNN. Calculating the gradient of the error in this manner is consistent with certain implementations of a gradient descent optimization method. In certain other implementations, this step can be omitted and/or substituted with another step in accordance with another optimization algorithm (e.g., a non-gradient descent optimization algorithm like simulated annealing or a genetic algorithm), as would be understood by one of ordinary skill in the art.

In step 1183 of training phase 400, a new set of coefficients are determined for the CNN. For example, the weights/coefficients can be updated using the change calculated in step 1182, as in a gradient descent optimization method or an over-relaxation acceleration method.

In step 1184 of training phase 400, a new error value is calculated using the updated weights/coefficients of the CNN.

In step 1185 of training phase 400, predefined stopping criteria are used to determine whether the training of the network is complete. For example, the predefined stopping criteria can evaluate whether the new error and/or the total number of iterations performed exceed predefined values. For example, the stopping criteria can be satisfied if either the new error falls below a predefined threshold (related to an ink demand threshold) or if a maximum number of iterations are reached. When the stopping criteria is not satisfied the training process performed in training phase 400 will continue back to the start of the iterative loop by returning and repeating step 1182 using the new weights and coefficients (the iterative loop includes steps 1182, 1183, 1184, and 1185). When the stopping criteria are satisfied, the training process performed in training phase 400 is completed.

Figure 12:
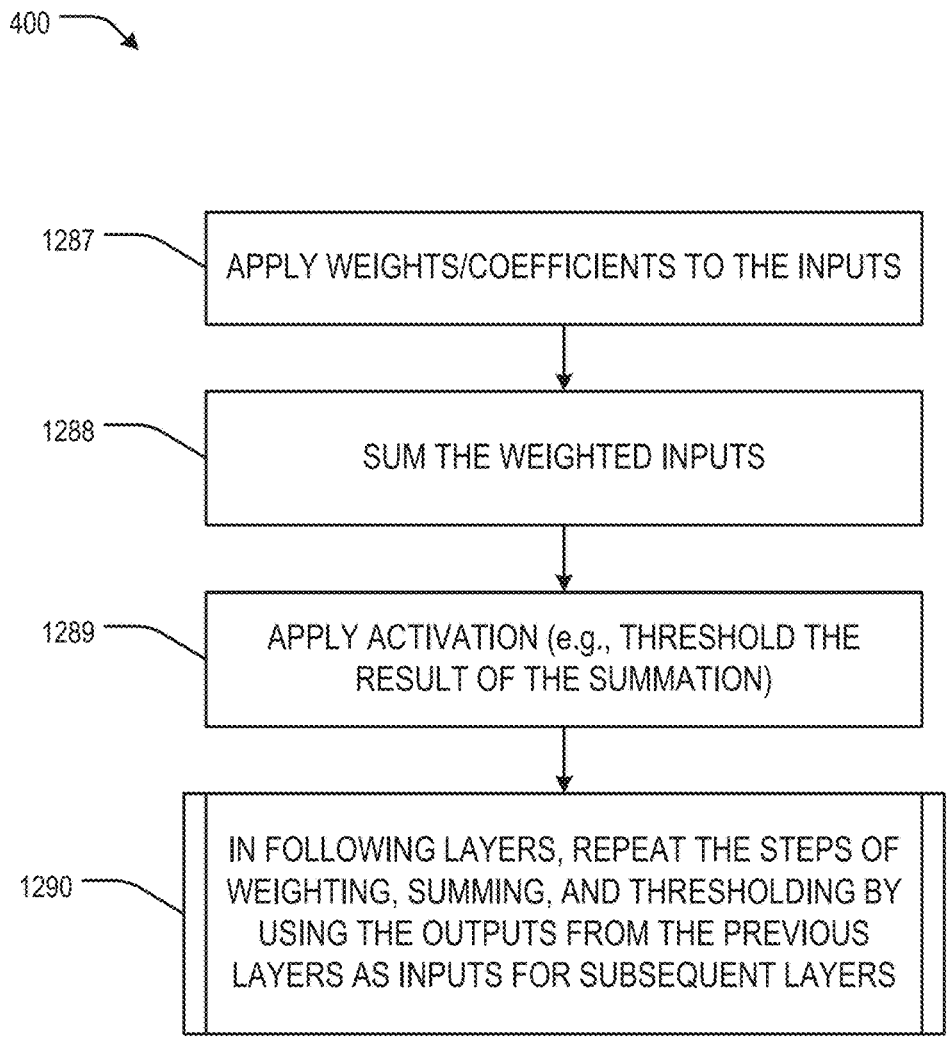
FIG. 12 is a generalized flow diagram of implementation of an artificial neural network, according to an exemplary embodiment of the present disclosure.
Figure 13:
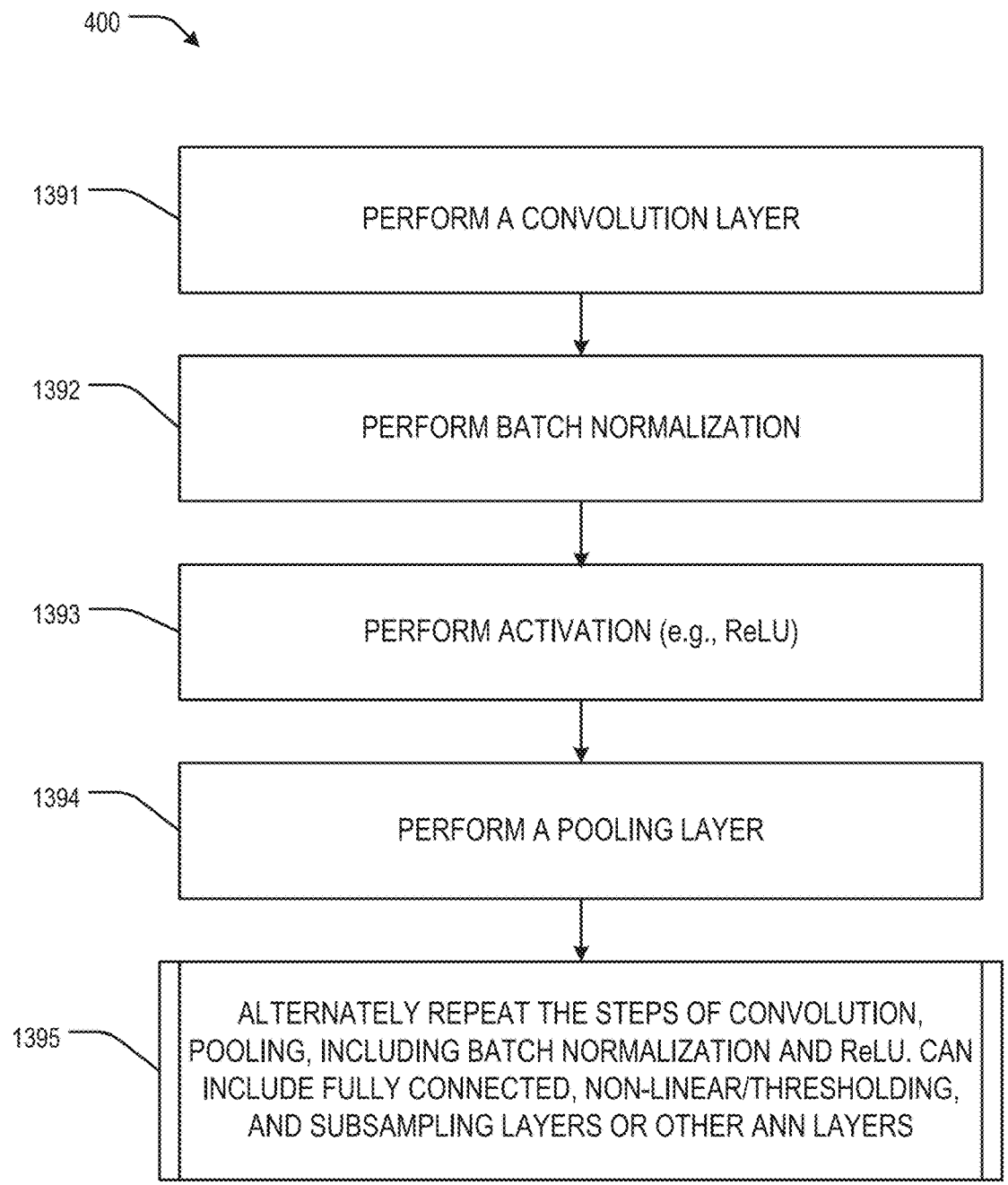
FIG. 13 is a flow diagram of implementation of a convolutional neural network, according to an exemplary embodiment of the present disclosure.

FIG. 12 and FIG. 13 show flow diagrams of implementations of training phase 400. FIG. 12 is general for any type of layer in a feedforward artificial neural network (ANN), including, for example, fully connected layers, whereas FIG. 13 is specific to convolutional, pooling, batch normalization, and ReLU layers in a CNN. The CNN of the present disclosure can include both fully connected layers and convolutional, pooling, batch normalization, and ReLU layers, resulting in a flow diagram that is a combination of FIG. 12 and FIG. 13, as would be understood by one of ordinary skill in the art. The implementations of training phase 400 shown in FIG. 12 and FIG. 13 also correspond to applying the CNN to the respective data, or training images, of the training dataset.

In step 1287, the weights/coefficients corresponding to the connections between neurons (i.e., nodes) are applied to the respective inputs corresponding to, for example, the pixels of the training image.

In step 1288, the weighted inputs are summed. When the only non-zero weights/coefficients connecting to a given neuron on the next layer are regionally localized in an image represented in the previous layer, the combination of step 1287 and step 1288 is essentially identical to performing a convolution operation.

In step 1289, respective thresholds are applied to the weighted sums of the respective neurons.

In process 1290, the steps of weighting, summing, and thresholding are repeated for each of the subsequent layers.

FIG. 13 shows a flow diagram of another implementation of training phase 400. The implementation of training phase 400 shown in FIG. 13 corresponds to operating on the training image at a hidden layer using a non-limiting implementation of the CNN.

In step 1391, the calculations for a convolution layer are performed as discussed in the foregoing and in accordance with the understanding of convolution layers of one of ordinary skill in the art.

In step 1392, following convolution, batch normalization can be performed to control for variation in the output of the previous layer, as would be understood by one of ordinary skill in the art.

In step 1393, following batch normalization, activation is performed according to the foregoing description of activation and in accordance with the understanding of activation of one of ordinary skill in the art. In an example, the activation function is a rectified activation function or, for example, a ReLU, as discussed above.

In another implementation, the ReLU layer of step 1393 may be performed prior to the batch normalization layer of step 1392.

In step 1394, the outputs from the convolution layer, following batch normalization and activation, are the inputs into a pooling layer that is performed according to the foregoing description of pooling layers and in accordance with the understanding of pooling layers of one of ordinary skill in the art.

In process 1395, the steps of a convolution layer, pooling layer, batch normalization layer, and ReLU layer can be repeated in whole or in part for a predefined number of layers. Following (or intermixed with) the above-described layers, the output from the ReLU layer can be fed to a predefined number of ANN layers that are performed according to the description provided for the ANN Layers in FIG. 12. The final output from the CNN will be a probability of whether the digital image should be altered.

Figure 14A:
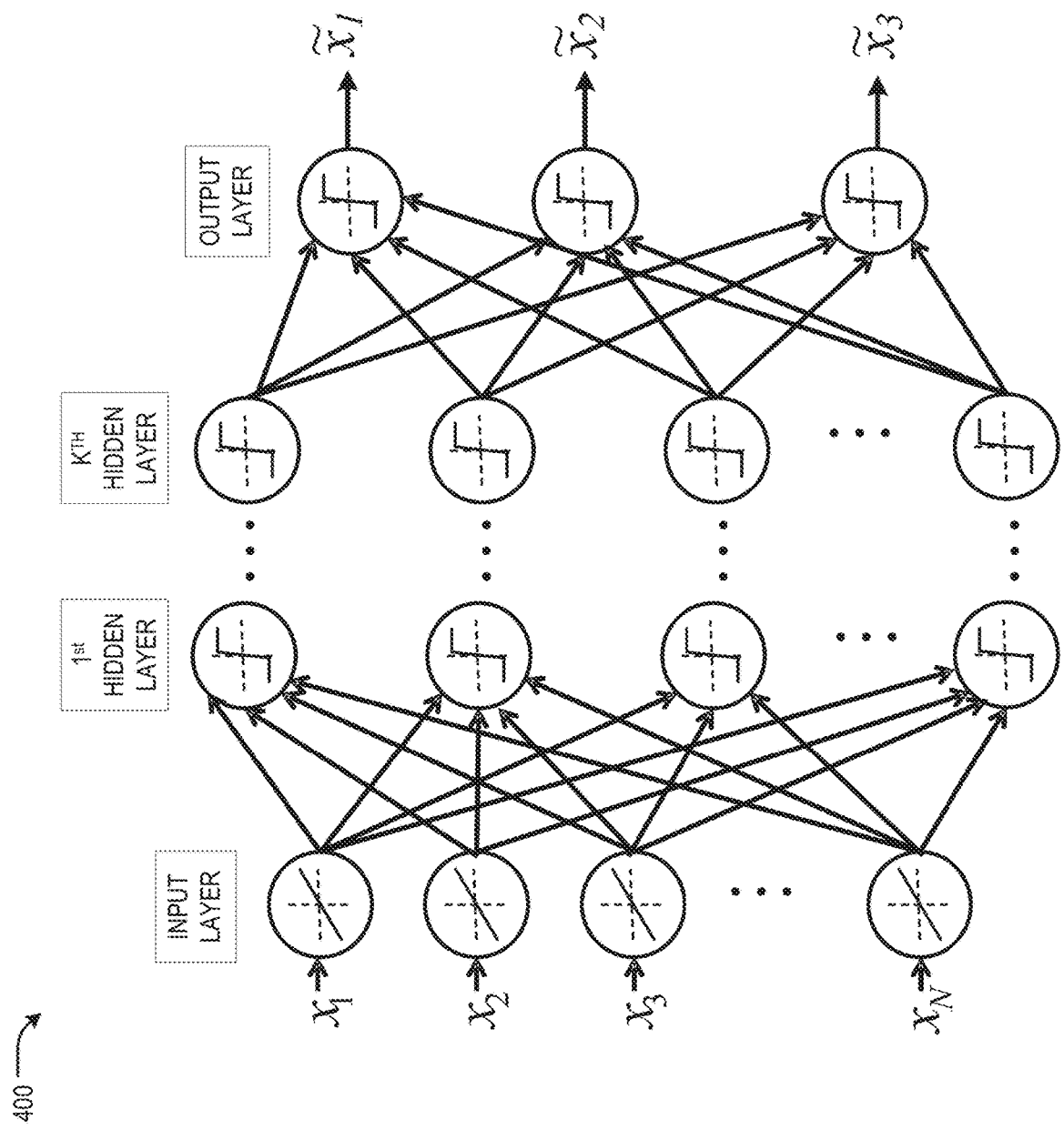
FIG. 14A is an example of a feedforward artificial neural network.
Figure 14B:
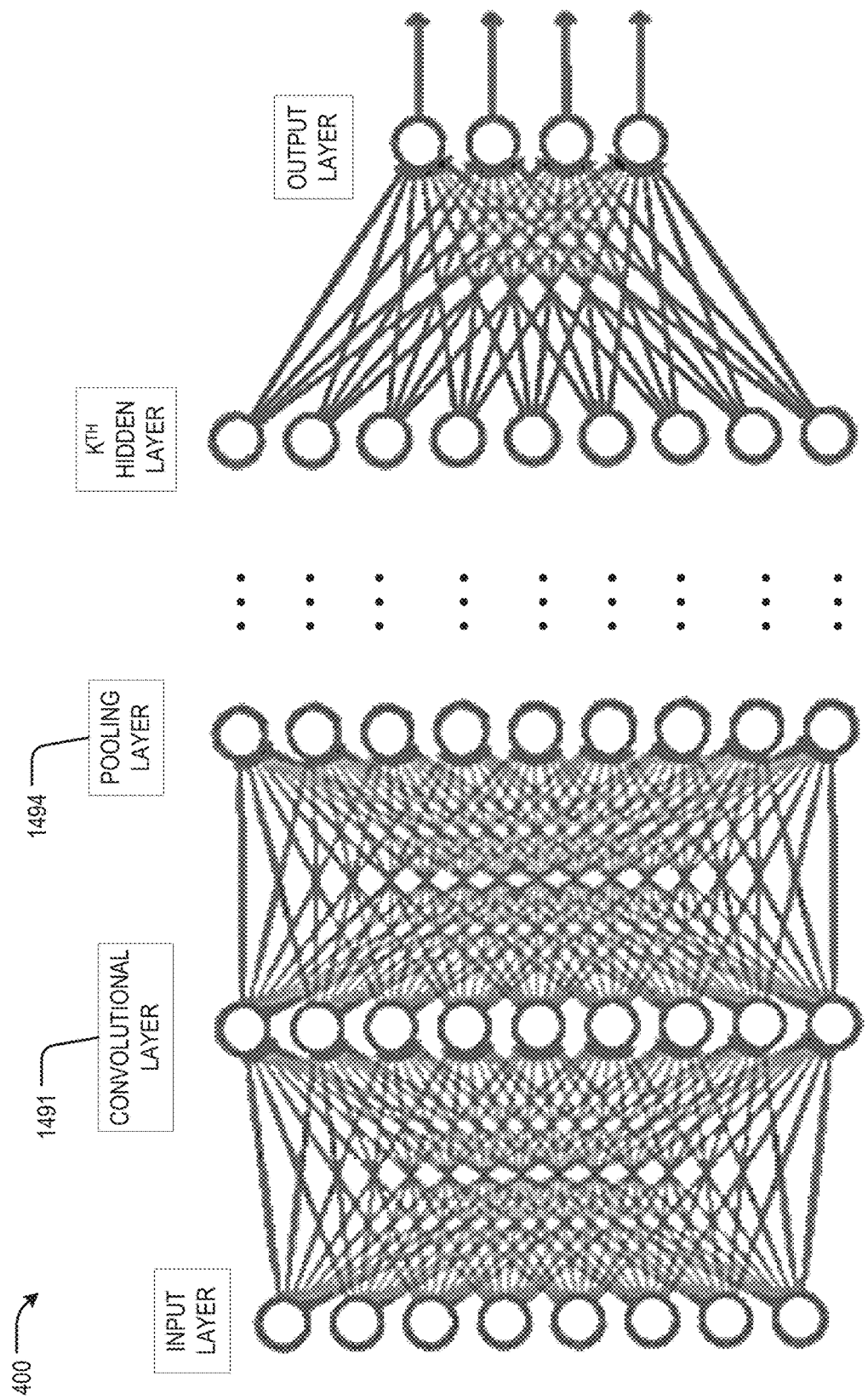
FIG. 14B is an example of a convolutional neural network, according to an exemplary embodiment of the present disclosure.

FIG. 14A and FIG. 14B show examples of the interconnections between layers in the CNN network. The CNN can include fully connected, convolutional, pooling, batch normalization, and activation layers, all of which are explained above and below. In certain preferred implementations of the CNN, convolutional layers are placed close to the input layer, whereas fully connected layers, which perform the high-level reasoning, are placed further down the architecture towards the loss function. Pooling layers can be inserted after convolutions and provide a reduction lowering the spatial extent of the filters, and thus the amount of learnable parameters. Batch normalization layers regulate gradient distractions to outliers and accelerate the learning process. Activation functions are also incorporated into various layers to introduce nonlinearity and enable the network to learn complex predictive relationships. The activation function can be a saturating activation function (e.g., a sigmoid or hyperbolic tangent activation function) or rectified activation function (e.g., ReLU discussed above).

FIG. 14A shows an example of a general artificial neural network (ANN) having N inputs, K hidden layers, and three outputs. Each layer is made up of nodes (also called neurons), and each node performs a weighted sum of the inputs and compares the result of the weighted sum to a threshold to generate an output. ANNs make up a class of functions for which the members of the class are obtained by varying thresholds, connection weights, or specifics of the architecture such as the number of nodes and/or their connectivity. The nodes in an ANN can be referred to as neurons (or as neuronal nodes), and the neurons can have inter-connections between the different layers of the ANN system. The simplest ANN has three layers and is called an autoencoder. The CNN of the present disclosure can have more than three layers of neurons and have as many output neurons 4 as input neurons, wherein N is the number of, for example, pixels in the training image. The synapses (i.e., the connections between neurons) store values called "weights" (also interchangeably referred to as "coefficients" or "weighting coefficients") that manipulate the data in the calculations. The outputs of the ANN depend on three types of parameters: (i) the interconnection pattern between the different layers of neurons, (ii) the learning process for updating the weights of the interconnections, and (iii) the activation function that converts a neuron's weighted input to its output activation.

Mathematically, a neuron's network function m(x) is defined as a composition of other functions $n_i(x)$, which can be further defined as a composition of other functions. This can be conveniently represented as a network structure, with arrows depicting the dependencies between variables, as shown in FIG. 14A and FIG. 14B. For example, the ANN can use a nonlinear weighted sum, wherein $m(x)=K(\Sigma_i w_i n_i(x))$ and where K (commonly referred to as the activation function) is some predefined function, such as the hyperbolic tangent.

In FIG. 14A (and similarly in FIG. 14B), the neurons (i.e., nodes) are depicted by circles around a threshold function. For the non-limiting example shown in FIG. 14A, the inputs are depicted as circles around a linear function and the arrows indicate directed communications between neurons. In certain implementations, the CNN is a feedforward network.

The CNN of the present disclosure operates to achieve a specific task, such as determining whether a segment of a digital image should be altered in order achieve a desired ink demand, by searching within the class of functions F to learn, using a set of observations, to find m*∈F, which solves the specific task in some optimal sense (e.g., the stopping criteria used in step 1185 discussed above). For example, in certain implementations, this can be achieved by defining a cost function C:F→m such that, for the optimal solution m*, C (m*)≤C(m)∀m∈F (i.e., no solution has a cost less than the cost of the optimal solution). The cost function C is a measure of how far away a particular solution is from an optimal solution to the problem to be solved (e.g., the error). Learning algorithms iteratively search through the solution space to find a function that has the smallest possible cost. In certain implementations, the cost is minimized over a sample of the data (i.e., the training data).

FIG. 14B shows a non-limiting example of a convolutional neural network (CNN), as in the present disclosure. CNNs are a type of ANN that have beneficial properties for image processing and, therefore, have special relevancy for applications of image processing. CNNs use feedforward ANNs in which the connectivity pattern between neurons can represent convolutions in image processing. For example, CNNs can be used for image-processing optimization by using multiple layers of small neuron collections which process portions of the input image, called receptive fields. The outputs of these collections can then be tiled so that they overlap to obtain a better representation of the original image. This processing pattern can be repeated over multiple layers having convolution 1491 and pooling layers 1494, as shown, and can include batch normalization and activation layers.

As generally applied above, following after a convolution layer 1491, a CNN can include local and/or global pooling layers 1494 which combine the outputs of neuron clusters in the convolution layers. Additionally, in certain implementations, the CNN can also include various combinations of convolutional and fully connected layers, with pointwise nonlinearity applied at the end of or after each layer.

While this specification contains many specific implementation details, these should not be construed as limitations on the scope of what may be claimed, but rather as descriptions of features that may be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that Such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring Such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Obviously, numerous modifications and variations are possible in light of the above teachings. It is therefore to be understood that within the scope of the appended claims, the embodiments of the present disclosure may be practiced otherwise than as specifically described herein.

Embodiments of the present disclosure may also be as set forth in the following parentheticals.

(1) A method for altering a digital image for a printing job, comprising receiving, by processing circuitry, a requested printing job including the digital image, performing, by the processing circuitry, a segmentation on the digital image, extracting, by the processing circuitry, values of properties for a segment of the segmented digital image, determining, by the processing circuitry and based on the extracted values of the properties for the segment, whether the segment of the digital image should be altered, and altering, by the processing circuitry, the segment of the digital image when it is determined the segment of the digital image should be altered, a resulting altered digital image being transmitted to a printer for printing.

(2) The method according to (1), wherein the altering is based on alteration instructions generated, by the processing circuitry, for the segment of the digital image when it is determined the segment of the digital image should be altered, the generated alteration instructions being based on a subset of the properties for the segment.

(3) The method according to either (1) or (2), further comprising estimating, by the processing circuitry, ink demand for the digital image based on the generated alteration instructions for the segment, and performing, by the processing circuitry, the altering of the segment when the estimated ink demand for the digital image satisfies a target ink demand.

(4) The method according to any one of (1) to (3), further comprising adjusting, by the processing circuitry, the generated alteration instructions when the estimated ink demand for the digital image does not satisfy the target ink demand, and iteratively preforming, by the processing circuitry, the determining, the estimating, and the altering until the estimated ink demand for the digital image satisfies the target ink demand.

(5) The method according to any one of (1) to (4), wherein the properties for the segment of the segmented digital image include one or more of color, area, homogeneity, and center of mass.

(6) The method according to any one of (1) to (5), wherein the determining whether the segment of the digital image should be altered includes applying, by the processing circuitry, a machine learning model to the extracted values of the segment of the segmented digital image, the machine learning model being trained to generate a probability that the segment should be altered.

(7) The method according to any one of (1) to (6), wherein the determining whether the segment of the digital image should be altered is based on one or more of printer properties, printing paper color, and printing paper gloss.

(8) The method according to any one of (1) to (7), wherein the altering of the segment of the digital image includes removing, by the processing circuitry, an inner area of the segment while maintaining an edge of the segment.

(9) The method according to any one of (1) to (8), wherein the altering the segment of the digital image includes inverting, by the processing circuitry, colors of the segment relative to a printing paper color.

(10) A non-transitory computer-readable storage medium storing computer-readable instructions that, when executed by a computer, cause the computer to perform a method for altering a digital image for a printing job, comprising receiving a requested printing job including the digital image, performing a segmentation on the digital image, extracting values of properties for a segment of the segmented digital image, determining, based on the extracted values of the properties for the segment, whether the segment of the digital image should be altered, and altering the segment of the digital image when it is determined the segment of the digital image should be altered, a resulting altered digital image being transmitted to a printer for printing.

(11) The non-transitory computer-readable storage medium according to (10), wherein the altering is based on alteration instructions generated for the segment of the digital image when it is determined the segment of the digital image should be altered, the generated alteration instructions being based on a subset of the properties for the segment.

(12) The non-transitory computer-readable storage medium according to either (10) or (11), further comprising estimating ink demand for the digital image based on the generated alteration instructions for the segment, and performing the altering of the segment when the estimated ink demand for the digital image satisfies a target ink demand.

(13) The non-transitory computer-readable storage medium according to any one of (10) to (12), further comprising adjusting the generated alteration instructions when the estimated ink demand for the digital image does not satisfy the target ink demand, and iteratively preforming the determining, the estimating, and the altering until the estimated ink demand for the digital image satisfies the target ink demand.

(14) The non-transitory computer-readable storage medium according to any one of (10) to (13), wherein the properties for the segment of the segmented digital image include one or more of color, area, homogeneity, and center of mass.

(15) The non-transitory computer-readable storage medium according to any one of (10) to (14), wherein the determining whether the segment of the digital image should be altered includes applying a machine learning model to the extracted values of the segment of the segmented digital image, the machine learning model being trained to generate a probability that the segment should be altered.

(16) The non-transitory computer-readable storage medium according to any one of (10) to (15), wherein the determining whether the segment of the digital image should be altered is based on one or more of printer properties, printing paper color, and printing paper gloss.

(17) The non-transitory computer-readable storage medium according to any one of (10) to (16), wherein the altering of the segment of the digital image includes removing an inner area of the segment while maintaining an edge of the segment.

(18) An apparatus for altering a digital image for a printing job, comprising processing circuitry configured to receive a requested printing job including the digital image, perform a segmentation on the digital image, extract values of properties for a segment of the segmented digital image, determine, based on the extracted values of the properties for the segment, whether the segment of the digital image should be altered, and alter the segment of the digital image when it is determined the segment of the digital image should be altered, a resulting altered digital image being transmitted to a printer for printing.

(19) The apparatus according to (18), wherein the processing circuitry is configured to determine whether the segment of the digital image should be altered by applying a machine learning model to the extracted values of the segment of the segmented digital image, the machine learning model being trained to generate a probability that the segment should be altered.

(20) The apparatus according to either (18) or (19), wherein the processing circuitry is configured to alter the segment of the digital image by removing an inner area of the segment while maintaining an edge of the segment.

(21) A method for altering a digital image for a printing job, comprising receiving, by processing circuitry, a requested printing job including the digital image, performing, by the processing circuitry, a segmentation on the digital image, extracting, by the processing circuitry, properties for a segment of the segmented digital image, comparing, by the processing circuitry, values of the extracted properties for the segment to respective alteration criteria, calculating, by the processing circuitry and based on the comparing, a segment alteration value for the segment, the calculated segment alteration value being a composite value reflecting the extracted properties for the segment, and altering, by the processing circuitry, the segment of the digital image when the calculated segment alteration value satisfies a composite alteration criterion, the altered digital image being transmitted to a printer for printing.

(22) The method according to (21), wherein the altering is based on alteration instructions generated, by the processing circuitry, for the segment of the digital image when the calculated segment alteration value satisfies the composite alteration criterion, the generated alteration instructions being based on a subset of the extracted properties.

(23) The method according to either (21) or (22), further comprising estimating, by the processing circuitry, ink demand for the digital image based on the generated alteration instructions for the segment, and performing, by the processing circuitry, the altering of the segment when the estimated ink demand for the digital image satisfies a target ink demand.

(24) The method according to any one of (21) to (23), further comprising adjusting, by the processing circuitry, the respective alteration criteria when the estimated ink demand for the digital image does not satisfy the target ink demand, and iteratively preforming, by the processing circuitry, the comparing, the calculating, and the estimating, and the altering until the estimated ink demand for the digital image satisfies the target ink demand.

(25) The method according to any one of (21) to (24), wherein the extracting the properties for the segment of the digital image includes applying, by the processing circuitry, a machine learning model to the segment of the segmented digital image, the machine learning model being trained to generate the values of the extracted properties for the segment.

(26) The method according to any one of (21) to (25), wherein the properties for the segment of the segmented digital image include one or more of color, area, homogeneity, and center of mass.

(27) The method according to any one of (21) to (26), wherein the respective alteration criteria include one or more of printer properties, printing paper color, and printing paper gloss.

(28) The method according to any one of (21) to (27), wherein the altering of the segment of the digital image includes removing, by the processing circuitry, an inner area of the segment while maintaining an edge of the segment.

(29) The method according to any one of (21) to (28), wherein the altering the segment of the digital image includes inverting, by the processing circuitry, colors of the segment relative to a printing paper color.

(30) A non-transitory computer-readable storage medium storing computer-readable instructions that, when executed by a computer, cause the computer to perform a method for altering a digital image for a printing job, comprising receiving a requested printing job including the digital image, performing a segmentation on the digital image, extracting properties for a segment of the segmented digital image, comparing values of the extracted properties for the segment to respective alteration criteria, calculating, based on the comparing, a segment alteration value for the segment, the calculated segment alteration value being a composite value reflecting the extracted properties for the segment, and altering the segment of the digital image when the calculated segment alteration value satisfies a composite alteration criterion, the altered digital image being transmitted to a printer for printing.

(31) The non-transitory computer-readable storage medium according to (30), wherein the altering is based on alteration instructions generated for the segment of the digital image when the calculated segment alteration value satisfies the composite alteration criterion, the generated alteration instructions being based on a subset of the extracted properties.

(32) The non-transitory computer-readable storage medium according to either (30) or (31), further comprising estimating ink demand for the digital image based on the generated alteration instructions for the segment, and performing the altering of the segment when the estimated ink demand for the digital image satisfies a target ink demand.

(33) The non-transitory computer-readable storage medium according to any one of (30) to (32), further comprising adjusting the respective alteration criteria when the estimated ink demand for the digital image does not satisfy the target ink demand, and iteratively preforming the comparing, the calculating, and the estimating, and the altering until the estimated ink demand for the digital image satisfies the target ink demand.

(34) The non-transitory computer-readable storage medium according to any one of (30) to (33), wherein the extracting the properties for the segment of the digital image includes applying a machine learning model to the segment of the segmented digital image, the machine learning model being trained to generate the values of the extracted properties for the segment.

(35) The non-transitory computer-readable storage medium according to any one of (30) to (34), wherein the properties for the segment of the segmented digital image include one or more of color, area, homogeneity, and center of mass.

(36) The non-transitory computer-readable storage medium according to any one of (30) to (35), wherein the respective alteration criteria include one or more of printer properties, printing paper color, and printing paper gloss.

(37) The non-transitory computer-readable storage medium according to any one of (30) to (36), wherein the altering of the segment of the digital image includes removing an inner area of the segment while maintaining an edge of the segment.

(38) An apparatus for altering a digital image for a printing job, comprising processing circuitry configured to receive a requested printing job including the digital image, perform a segmentation on the digital image, extract properties for a segment of the segmented digital image, compare values of the extracted properties for the segment to respective alteration criteria, calculate, based on the comparison, a segment alteration value for the segment, the calculated segment alteration value being a composite value reflecting the extracted properties for the segment, and alter the segment of the digital image when the calculated segment alteration value satisfies a composite alteration criterion, the altered digital image being transmitted to a printer for printing.

(39) The apparatus according to (38), wherein the processing circuitry is configured to extract the properties for the segment of the digital image by applying a machine learning model to the segment of the segmented digital image, the machine learning model being trained to generate the values of the extracted properties for the segment.

(40) The apparatus according to either (38) or (39), wherein the processing circuitry is configured to alter the segment of the digital image by removing an inner area of the segment while maintaining an edge of the segment.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. A method for altering a digital image for a printing job, comprising:
   receiving, by processing circuitry, a requested printing job including the digital image;
   performing, by the processing circuitry, a segmentation on the digital image;
   extracting, by the processing circuitry, values of properties for a segment of the segmented digital image;
   determining, by the processing circuitry and based on the extracted values of the properties for the segment, whether the segment of the digital image should be altered; and
   altering, by the processing circuitry, the segment of the digital image when it is determined the segment of the digital image should be altered, a resulting altered digital image being transmitted to a printer for printing, wherein
   the determining whether the segment of the digital image should be altered includes applying, by the processing circuitry, a machine learning model to the extracted values of the segment of the segmented digital image, the machine learning model being trained to generate a probability that the segment should be altered.

2. The method according to claim 1, wherein the altering is based on alteration instructions generated, by the processing circuitry, for the segment of the digital image when it is determined the segment of the digital image should be altered, the generated alteration instructions being based on a subset of the properties for the segment.

3. The method according to claim 2, further comprising
estimating, by the processing circuitry, ink demand for the digital image based on the generated alteration instructions for the segment, and
performing, by the processing circuitry, the altering of the segment when the estimated ink demand for the digital image satisfies a target ink demand.

4. The method according to claim 3, further comprising
adjusting, by the processing circuitry, the generated alteration instructions when the estimated ink demand for the digital image does not satisfy the target ink demand, and
iteratively performing, by the processing circuitry, the determining, the estimating, and the altering until the estimated ink demand for the digital image satisfies the target ink demand.

5. The method according to claim 1, wherein the properties for the segment of the segmented digital image include one or more of color, area, homogeneity, and center of mass.

6. The method according to claim 1, wherein the determining whether the segment of the digital image should be altered is based on one or more of printer properties, printing paper color, and printing paper gloss.

7. The method according to claim 1, wherein the altering of the segment of the digital image includes
removing, by the processing circuitry, an inner area of the segment while maintaining an edge of the segment.

8. The method according to claim 1, wherein the altering the segment of the digital image includes
inverting, by the processing circuitry, colors of the segment relative to a printing paper color.

9. A non-transitory computer-readable storage medium storing computer-readable instructions that, when executed by a computer, cause the computer to perform a method for altering a digital image for a printing job, comprising:
receiving a requested printing job including the digital image;
performing a segmentation on the digital image;
extracting values of properties for a segment of the segmented digital image;
determining, based on the extracted values of the properties for the segment, whether the segment of the digital image should be altered; and
altering the segment of the digital image when it is determined the segment of the digital image should be altered, a resulting altered digital image being transmitted to a printer for printing, wherein
the determining whether the segment of the digital image should be altered includes applying a machine learning model to the extracted values of the segment of the segmented digital image, the machine learning model being trained to generate a probability that the segment should be altered.

10. The non-transitory computer-readable storage medium according to claim 9, wherein the altering is based on alteration instructions generated for the segment of the digital image when it is determined the segment of the digital image should be altered, the generated alteration instructions being based on a subset of the properties for the segment.

11. The non-transitory computer-readable storage medium according to claim 10, further comprising
estimating ink demand for the digital image based on the generated alteration instructions for the segment, and
performing the altering of the segment when the estimated ink demand for the digital image satisfies a target ink demand.

12. The non-transitory computer-readable storage medium according to claim 11, further comprising
adjusting the generated alteration instructions when the estimated ink demand for the digital image does not satisfy the target ink demand, and
iteratively performing the determining, the estimating, and the altering until the estimated ink demand for the digital image satisfies the target ink demand.

13. The non-transitory computer-readable storage medium according to claim 9, wherein the properties for the segment of the segmented digital image include one or more of color, area, homogeneity, and center of mass.

14. The non-transitory computer-readable storage medium according to claim 9, wherein the determining whether the segment of the digital image should be altered is based on one or more of printer properties, printing paper color, and printing paper gloss.

15. The non-transitory computer-readable storage medium according to claim 9, wherein the altering of the segment of the digital image includes
removing an inner area of the segment while maintaining an edge of the segment.

16. An apparatus for altering a digital image for a printing job, comprising:
processing circuitry configured to
receive a requested printing job including the digital image,
perform a segmentation on the digital image,
extract values of properties for a segment of the segmented digital image,
determine, based on the extracted values of the properties for the segment, whether the segment of the digital image should be altered, and
alter the segment of the digital image when it is determined the segment of the digital image should be altered, a resulting altered digital image being transmitted to a printer for printing, wherein
the processing circuitry is configured to determine whether the segment of the digital image should be altered by applying a machine learning model to the extracted values of the segment of the segmented digital image, the machine learning model being trained to generate a probability that the segment should be altered.

17. The apparatus according to claim 16, wherein the processing circuitry is configured to alter the segment of the digital image by
removing an inner area of the segment while maintaining an edge of the segment.

* * * * *